US012719825B2

(12) United States Patent
Jung et al.

(10) Patent No.: US 12,719,825 B2
(45) Date of Patent: Aug. 25, 2026

(54) DEVICE AND METHOD FOR PERFORMING PRIORITY SETTING AND PROCESSING ON BASIS OF SEMANTIC MESSAGE TYPE IN SEMANTIC COMMUNICATION

(71) Applicant: LG ELECTRONICS INC., Seoul (KR)

(72) Inventors: Ikjoo Jung, Seoul (KR); Sangrim Lee, Seoul (KR); Kijun Jeon, Seoul (KR); Taehyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 18/719,801

(22) PCT Filed: Nov. 29, 2022

(86) PCT No.: PCT/KR2022/019114
§ 371 (c)(1),
(2) Date: Jun. 13, 2024

(87) PCT Pub. No.: WO2023/113302
PCT Pub. Date: Jun. 22, 2023

(65) Prior Publication Data

US 2025/0150428 A1 May 8, 2025

(30) Foreign Application Priority Data

Dec. 13, 2021 (KR) ........................ 10-2021-0177979

(51) Int. Cl.
*H04L 51/58* (2022.01)
*H04L 1/22* (2006.01)

(52) U.S. Cl.
CPC ................ *H04L 51/58* (2022.05); *H04L 1/22* (2013.01)

(58) Field of Classification Search
CPC ......... H04L 1/22; H04L 51/58; H04L 51/226; G06N 3/044; G06N 3/045; G06N 3/02; G06N 5/022; G06N 3/08
See application file for complete search history.

(56) References Cited

U.S. PATENT DOCUMENTS 11,895,629 B1 * 2/2024 Niu ..................... H04W 72/044
2016/0255139 A1 * 9/2016 Rathod ................. H04L 51/046
709/203

(Continued)

FOREIGN PATENT DOCUMENTS

| | | |
|---|---|---|
| KR | 100869624 | 11/2008 |
| KR | 1020180129001 | 12/2018 |
| KR | 1020210091346 | 7/2021 |

OTHER PUBLICATIONS

PCT International Application No. PCT/KR2022/019114, International Search Report dated Mar. 16, 2023, 3 pages.

(Continued)

*Primary Examiner* — Andrew Lee
(74) *Attorney, Agent, or Firm* — LEE, HONG, DEGERMAN, KANG & WAIMEY

(57) ABSTRACT

The present disclosure may provide a device and a method for priority setting and processing of a plurality of semantic messages based on semantic message types in semantic communication. The present disclosure may provide a device and a method for processing a semantic message based on the priority of a received semantic message by first checking flag bits corresponding to the semantic message type and identifying the type of the semantic message that follows the flag bits.

17 Claims, 32 Drawing Sheets

(56) References Cited

U.S. PATENT DOCUMENTS

| | | | | |
|---|---|---|---|---|
| 2020/0089172 | A1* | 3/2020 | Yoon | G05D 1/0088 |
| 2022/0224442 | A1* | 7/2022 | Srivastava | G06N 5/022 |
| 2023/0198663 | A1* | 6/2023 | Stoica | H04L 1/0056 714/726 |
| 2023/0199746 | A1* | 6/2023 | Vannithamby | G06N 7/01 370/452 |
| 2024/0304191 | A1* | 9/2024 | Balasubramanian | G10L 19/005 |
| 2024/0381059 | A1* | 11/2024 | Tian | H04W 24/02 |
| 2025/0015920 | A1* | 1/2025 | Hsu | H04W 24/02 |

OTHER PUBLICATIONS

Tao et al., "Facilitating Twitter Data Analytics: Platform , Language and Functionality," 2014 IEEE International Conference on Big Data, Jan. 2015, 10 pages.

Pliatsios et al., "A Review on IoT Frameworks Supporting Multi-Level Interoperability—The Semantic Social Network of Things Framework," International Journal on Advances in Internet Technology, vol. 13 No. 1 & 2, 2020, 19 pages.

* cited by examiner

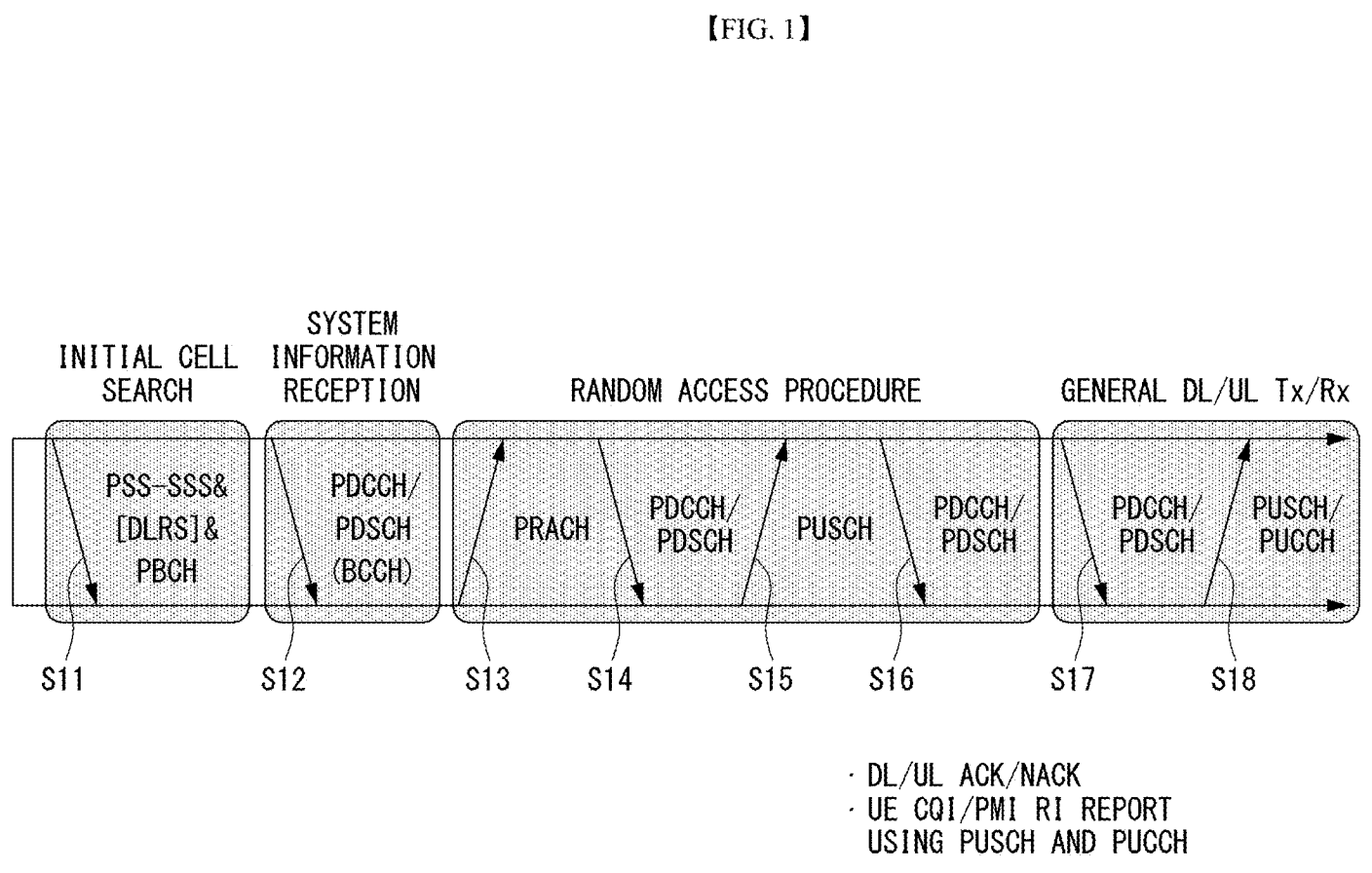

【FIG. 1】

INITIAL CELL SEARCH
PSS-SSS& [DLRS]& PBCH
S11
SYSTEM INFORMATION RECEPTION
PDCCH/ PDSCH (BCCH)
S12
RANDOM ACCESS PROCEDURE
PRACH
S13
PDCCH/ PDSCH
S14
PUSCH
S15
PDCCH/ PDSCH
S16
GENERAL DL/UL Tx/Rx
PDCCH/ PDSCH
S17
PUSCH/ PUCCH
S18

· DL/UL ACK/NACK
· UE CQI/PMI RI REPORT USING PUSCH AND PUCCH

【FIG. 2】
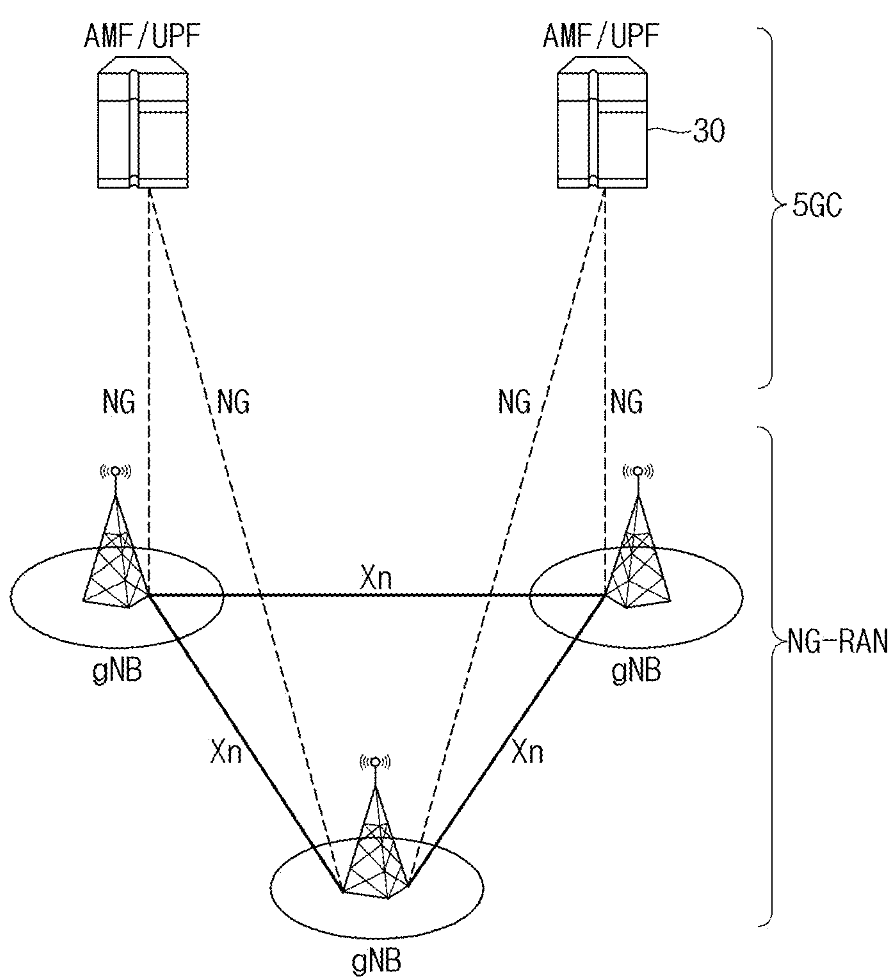

【FIG. 3】
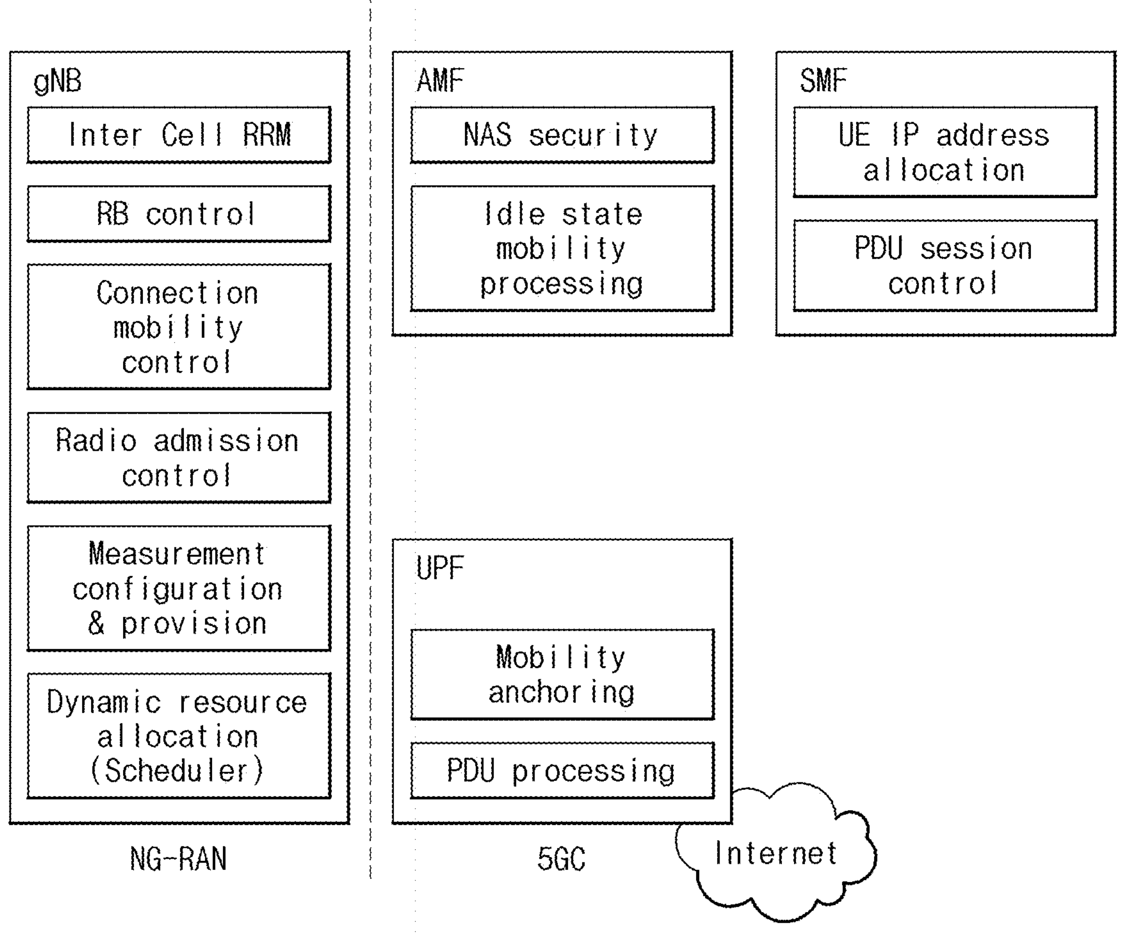

【FIG. 4】
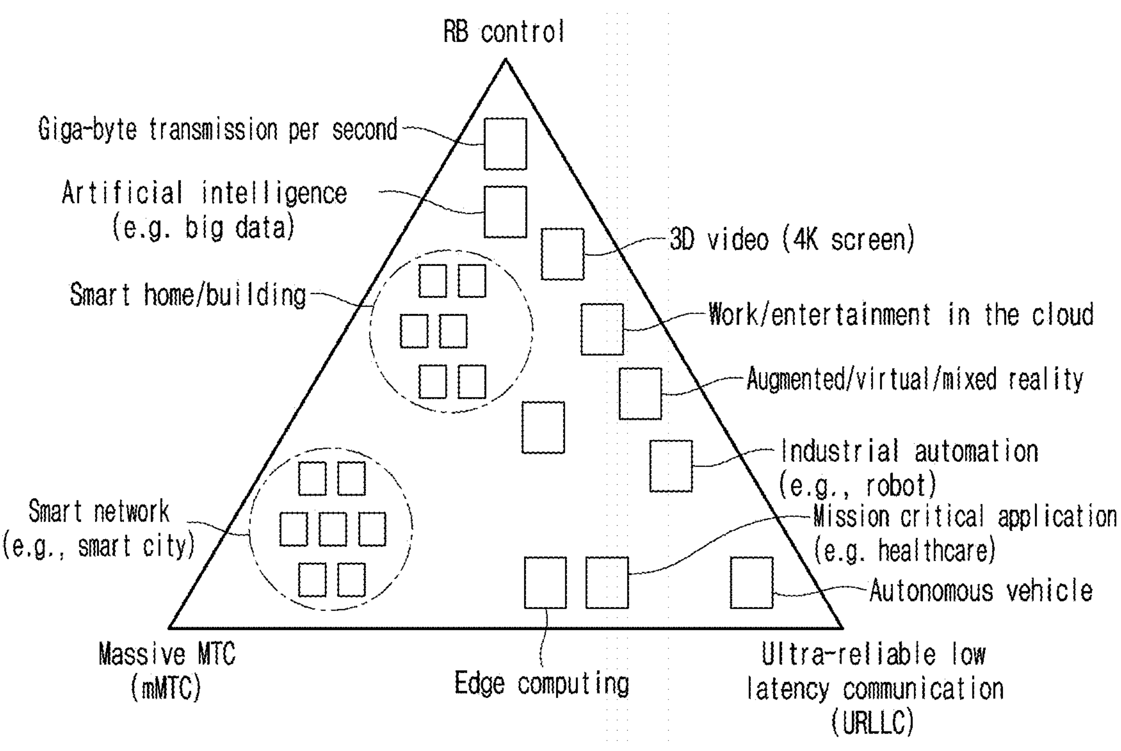

【FIG. 5】
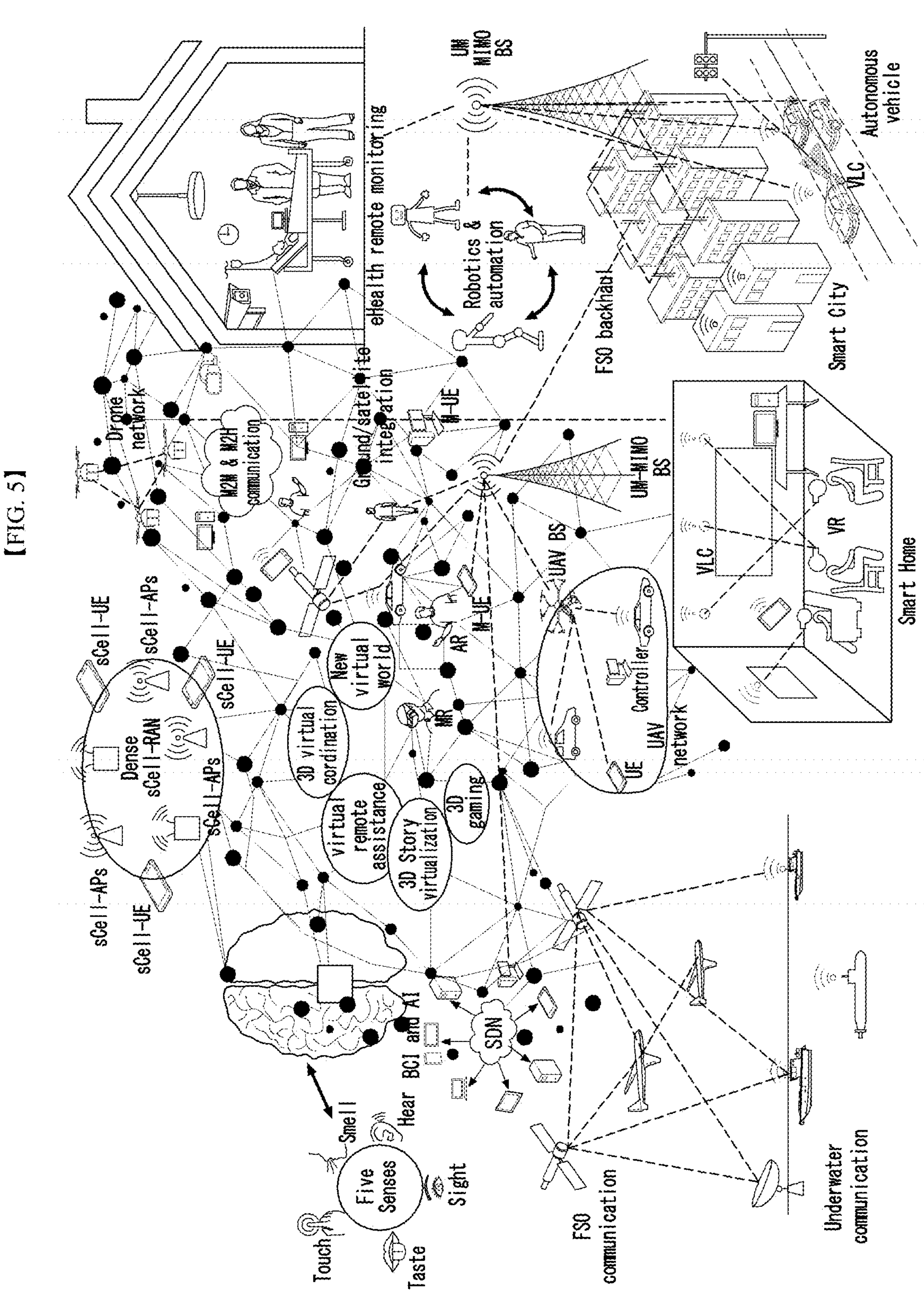

【FIG. 6】
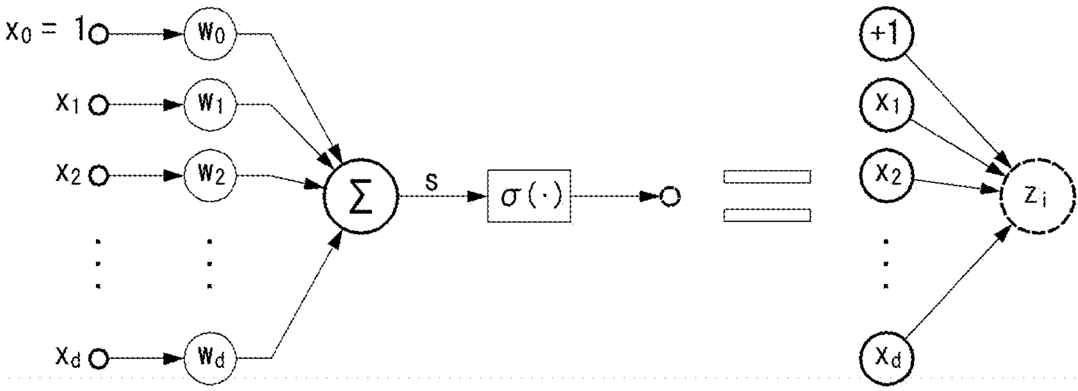

【FIG. 7】
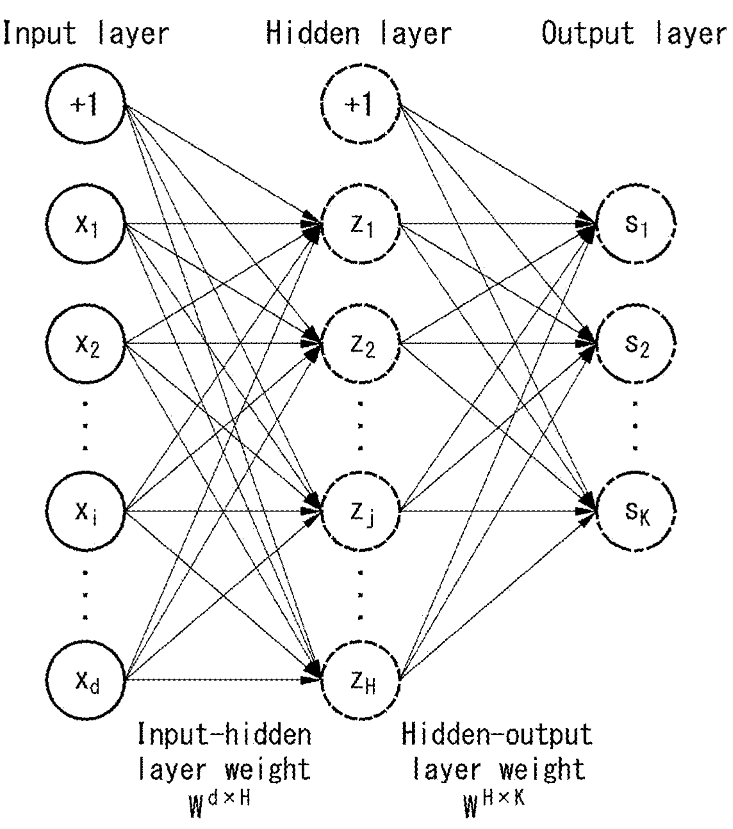

【FIG. 8】
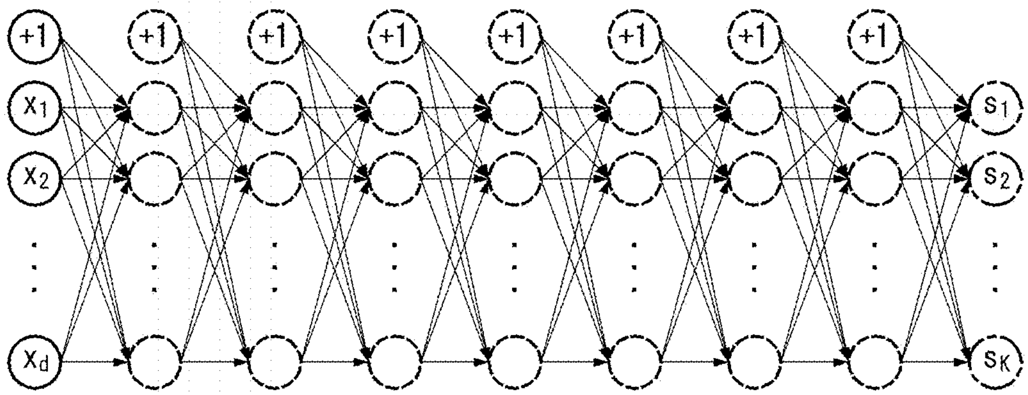

【FIG. 9】
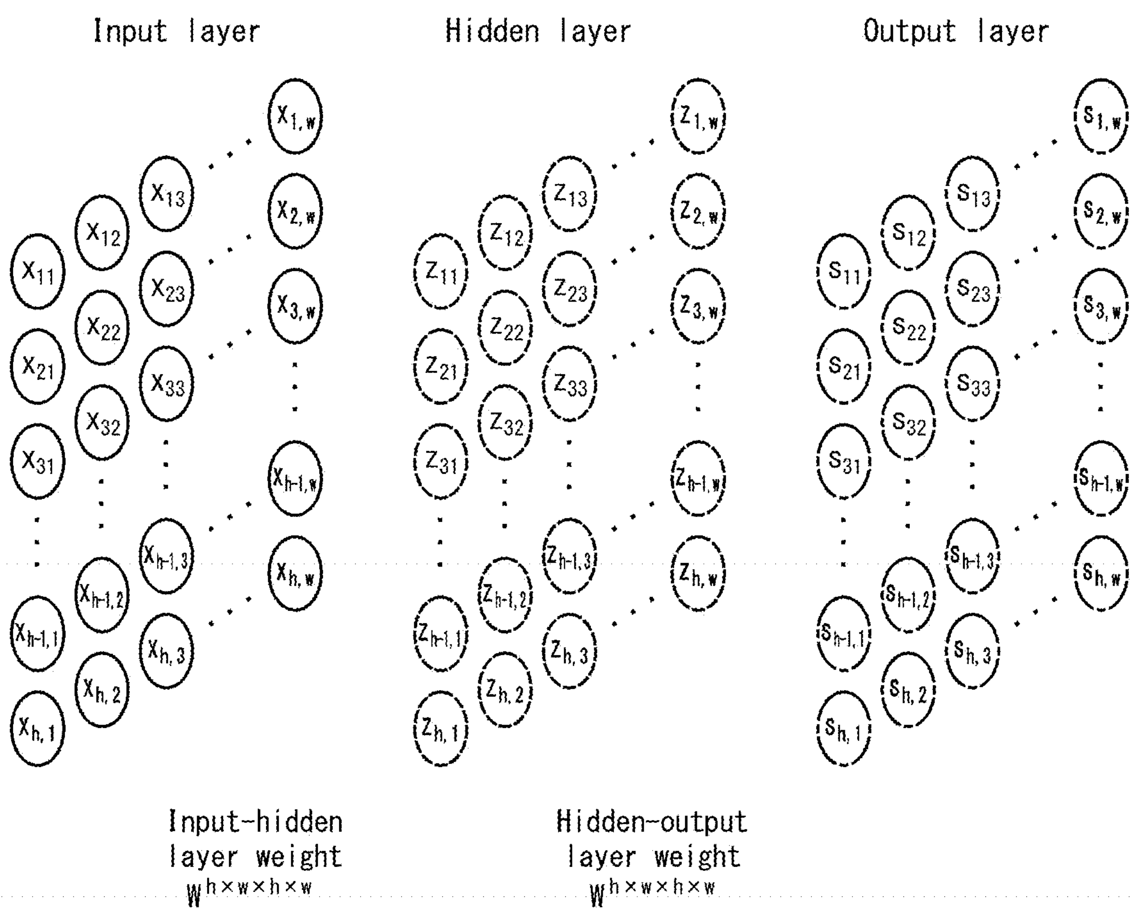

【FIG. 10】
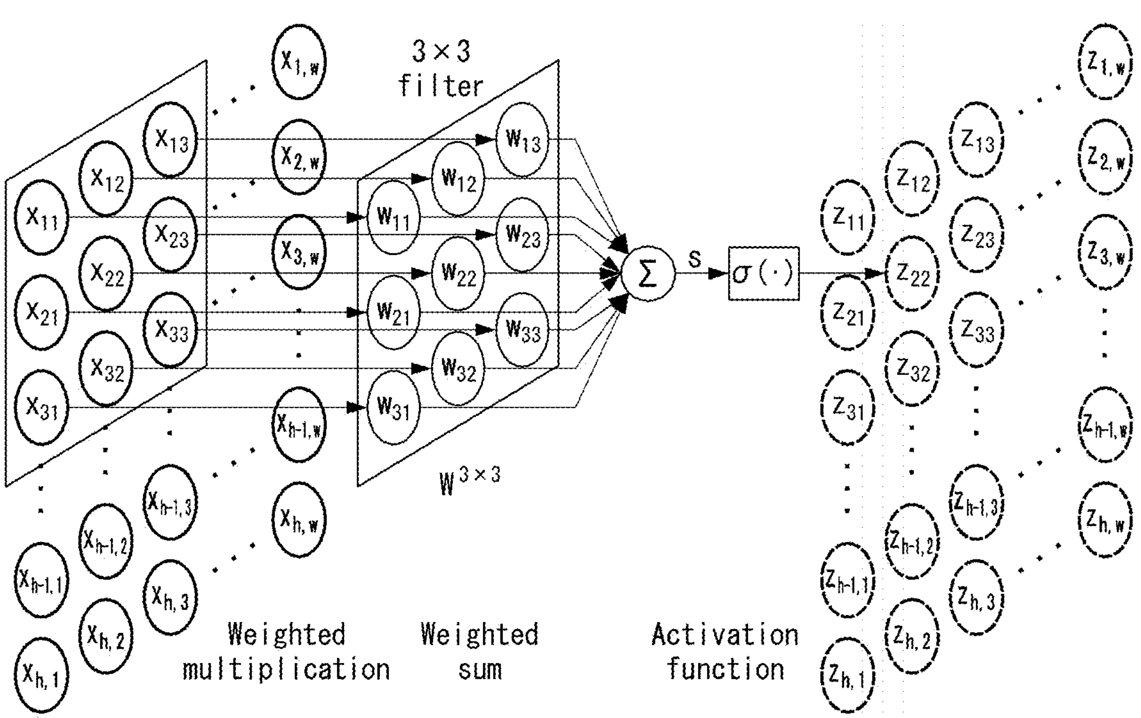

【FIG. 11】
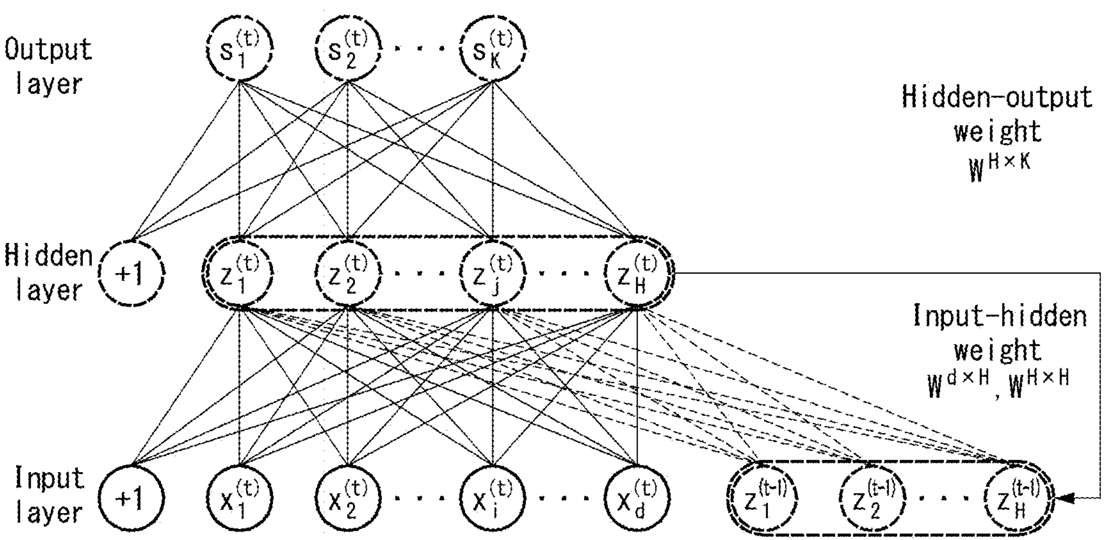

【FIG. 12】
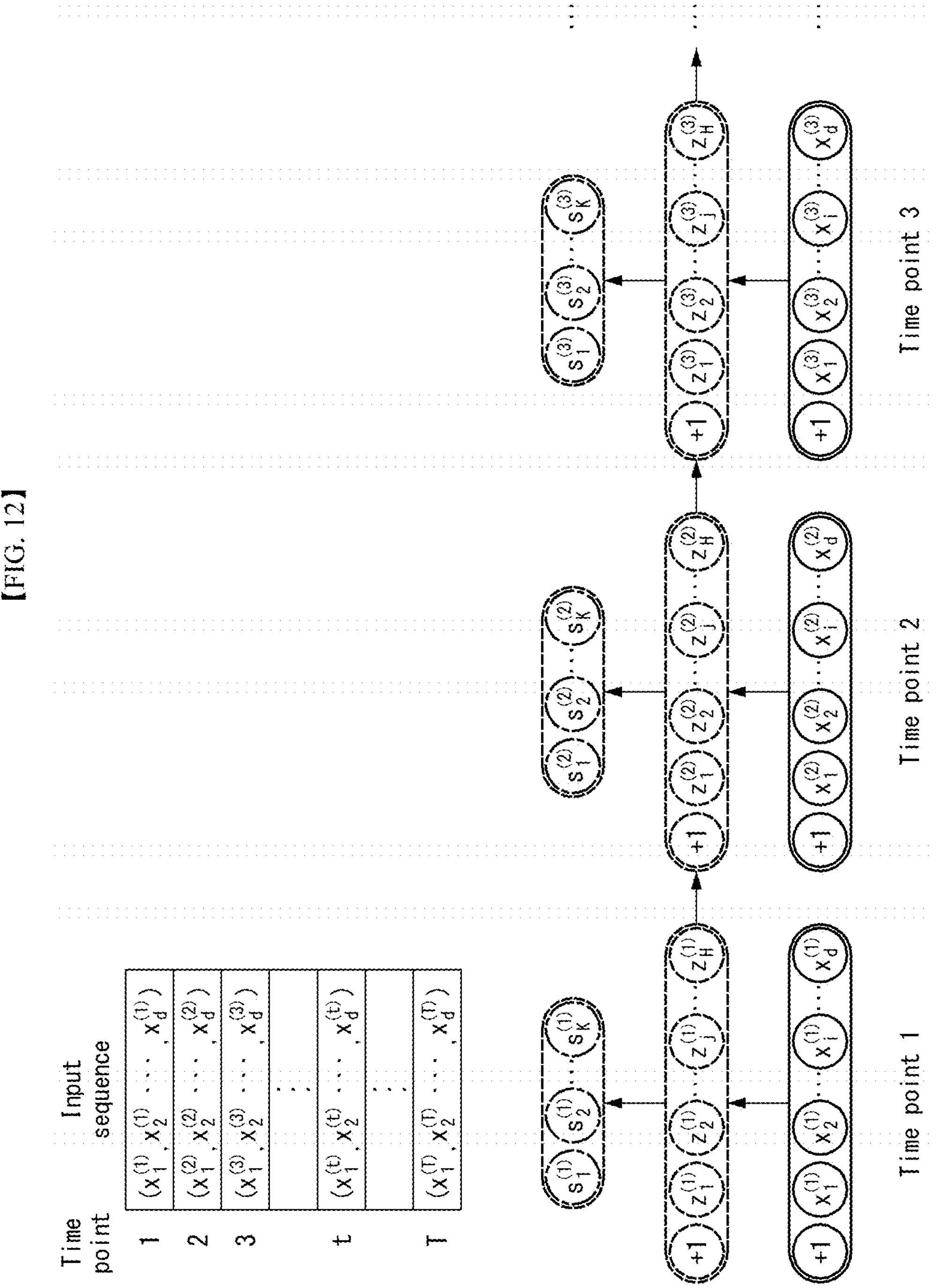

【FIG. 13】
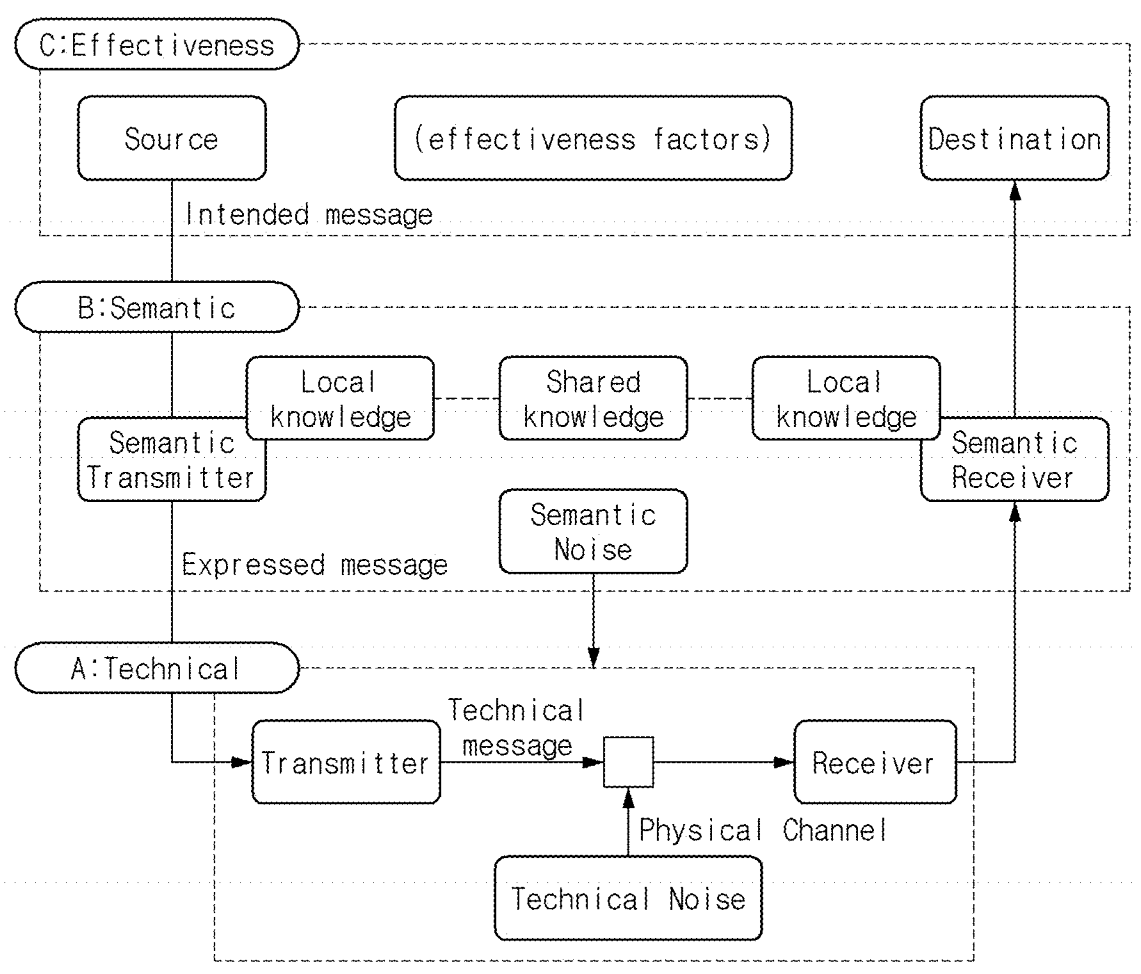

【FIG. 14】
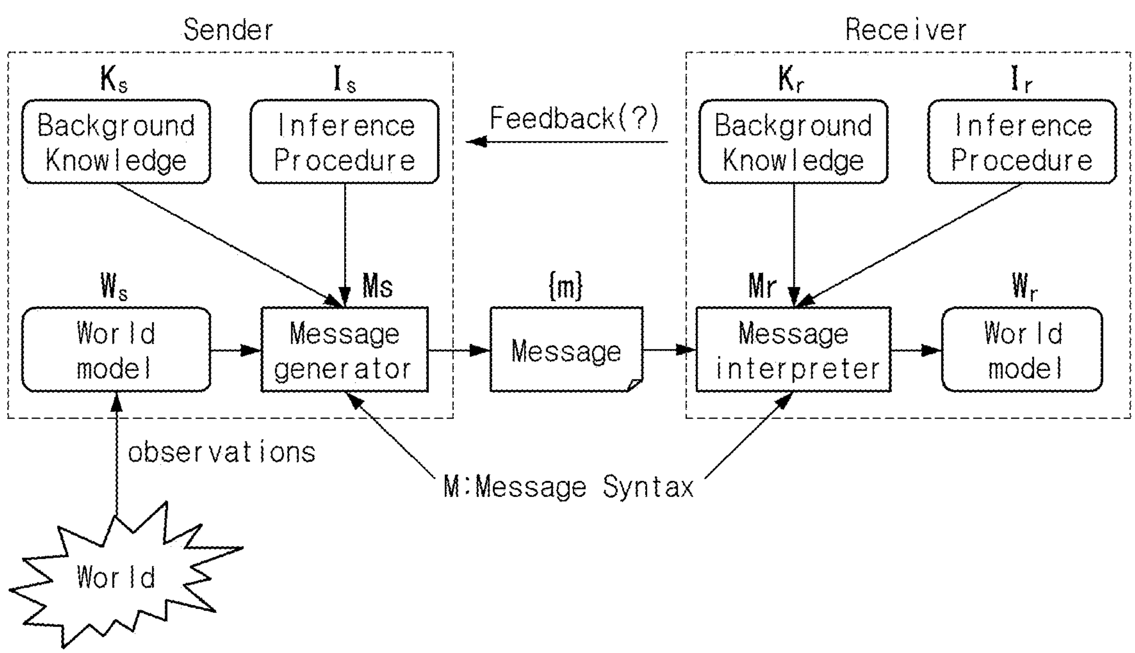

【FIG. 15】
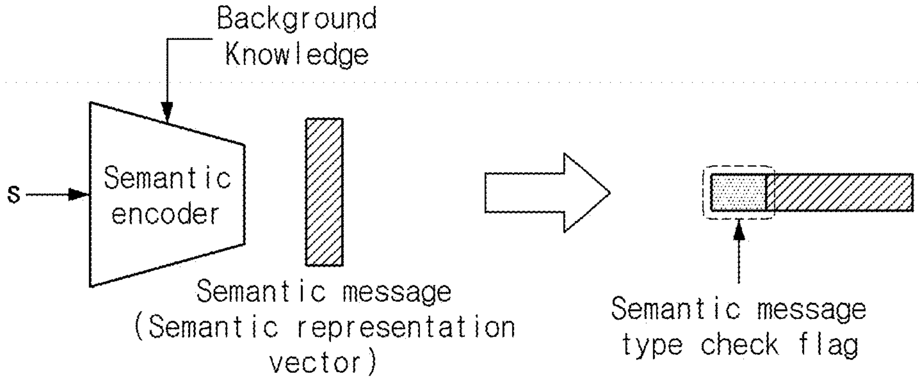

【FIG. 16】
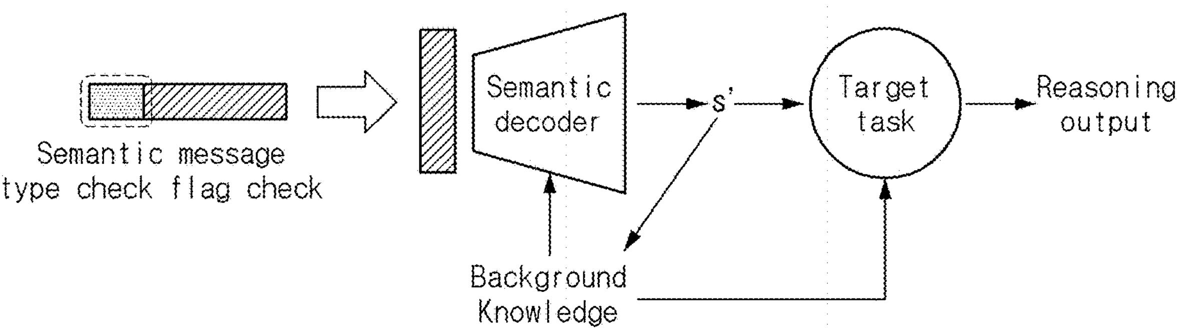

【FIG. 17】
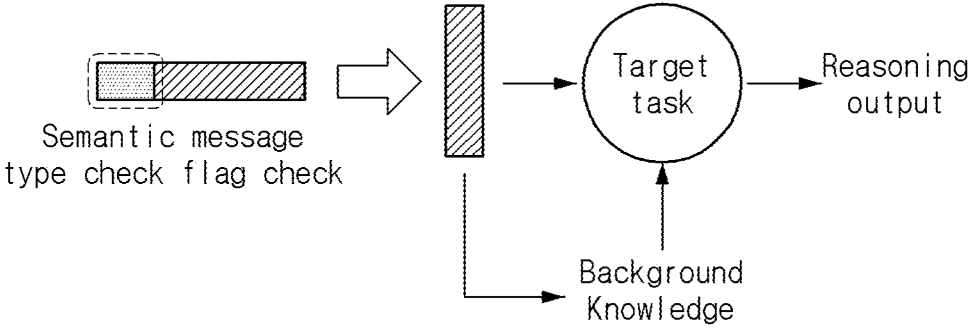

【FIG. 18】
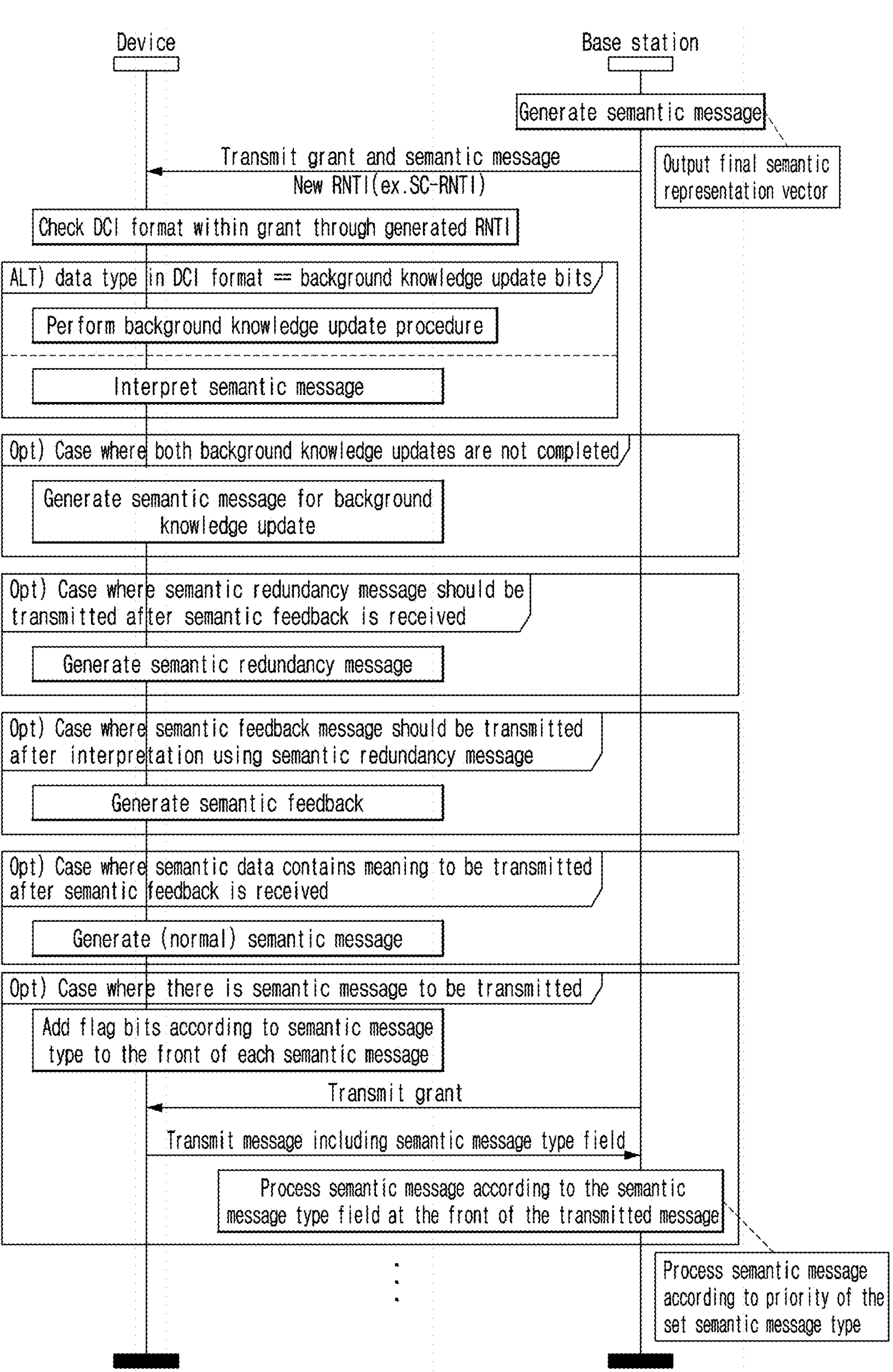

【FIG. 19】
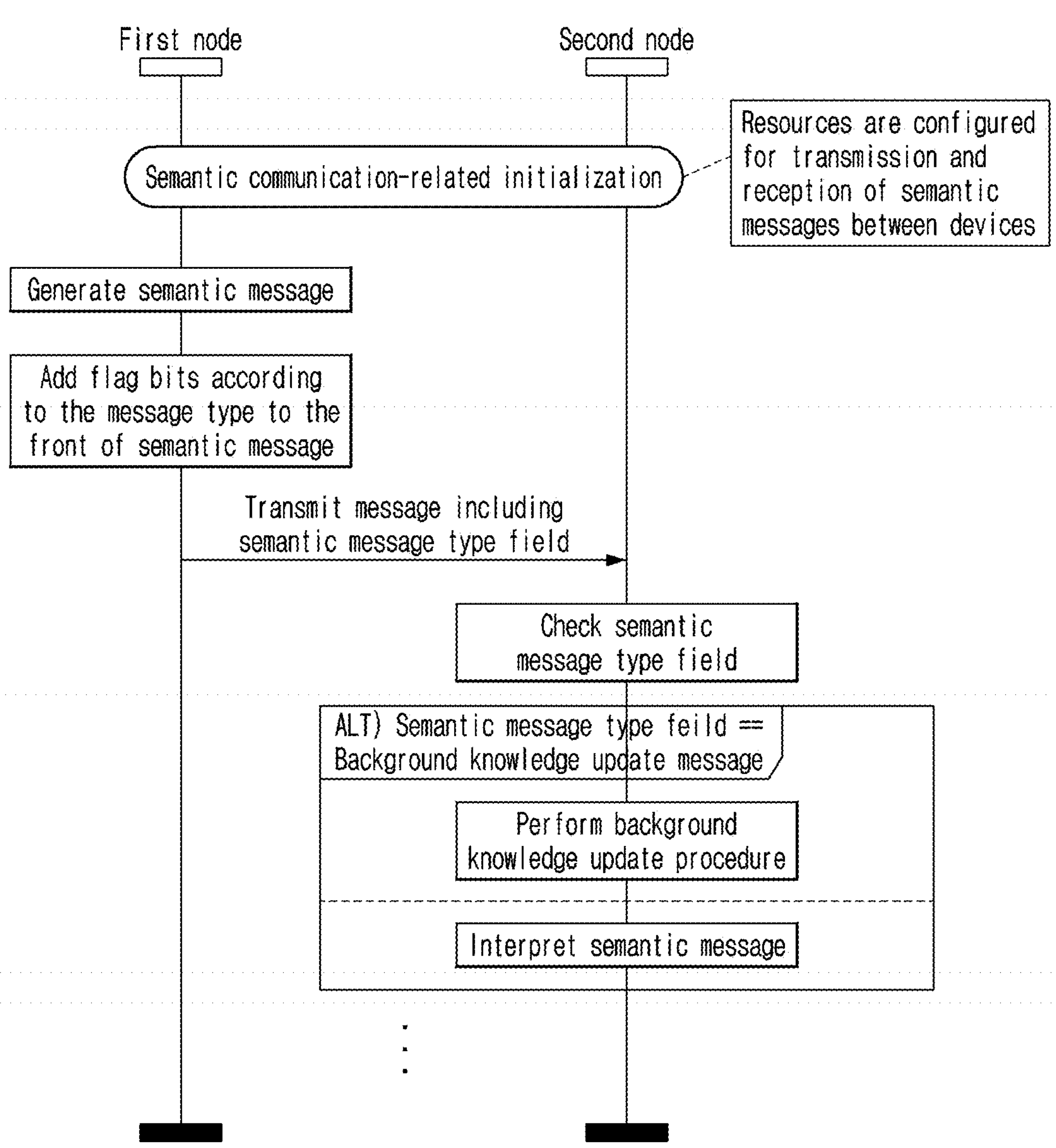

【FIG. 20】
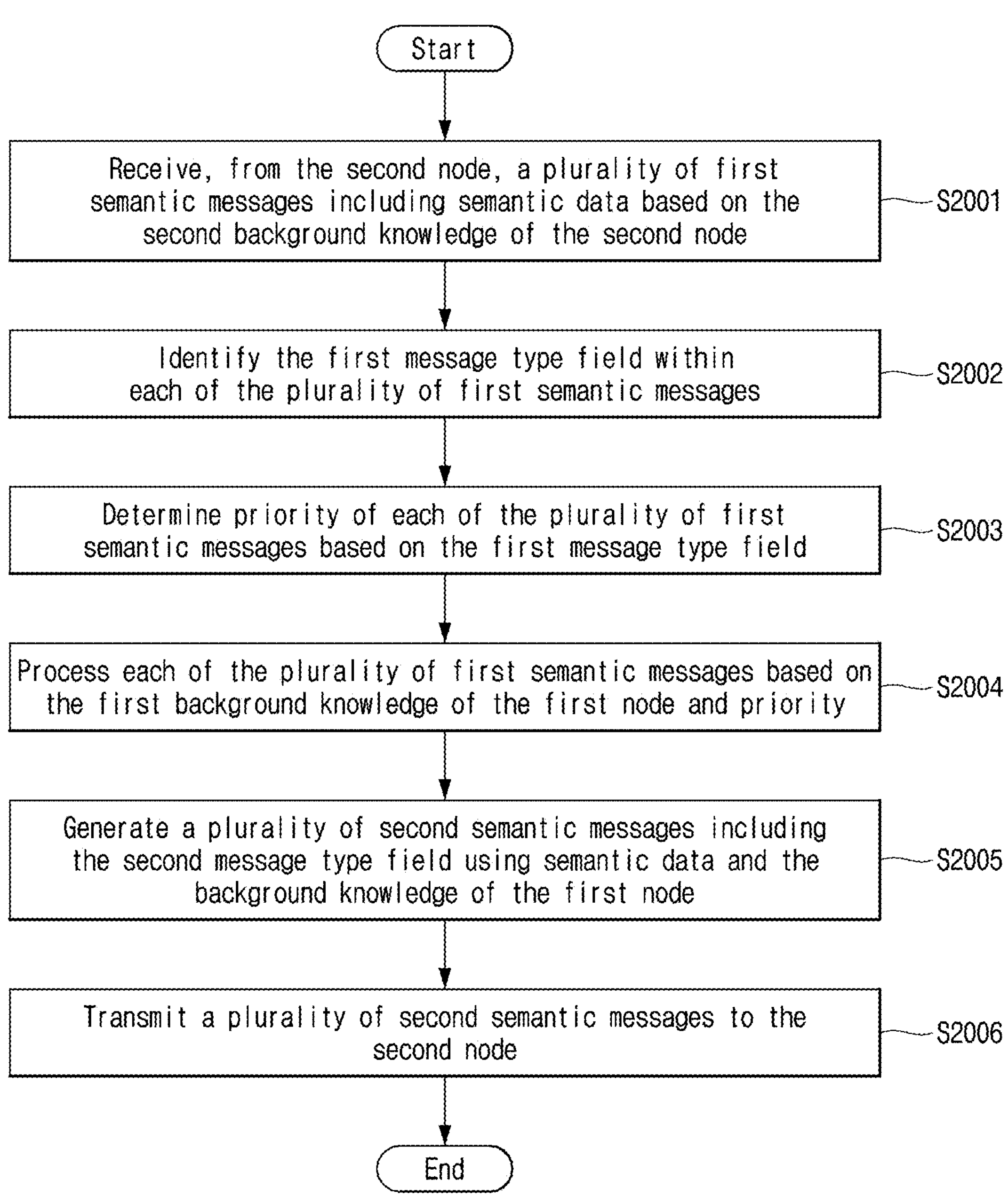

【FIG. 21】
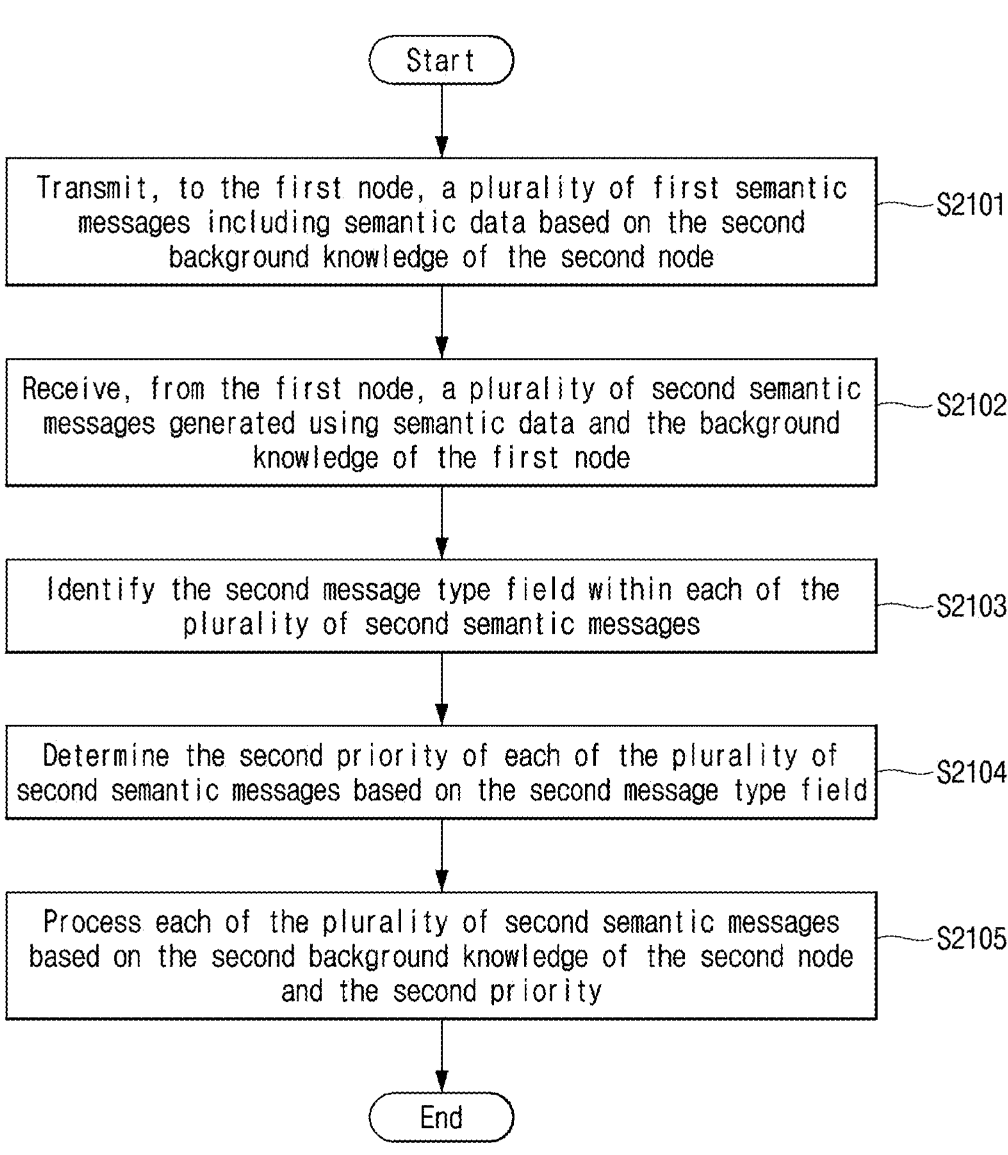

【FIG. 22】
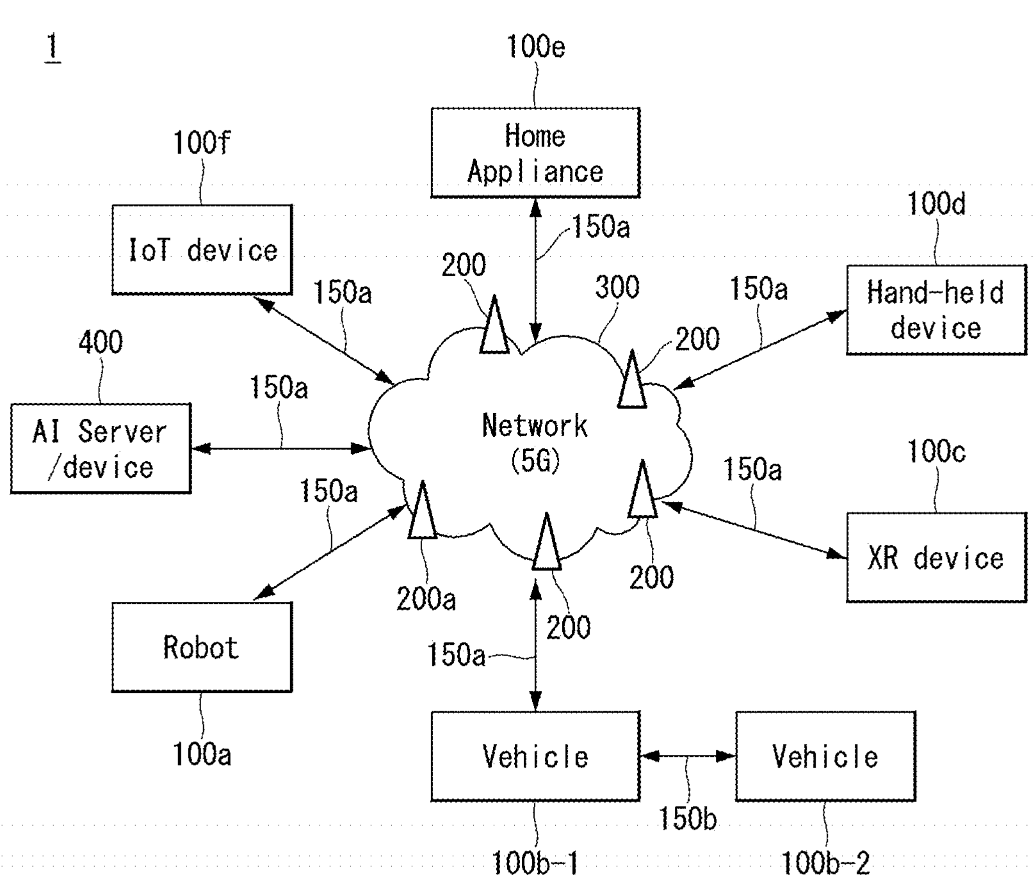

【FIG. 23】
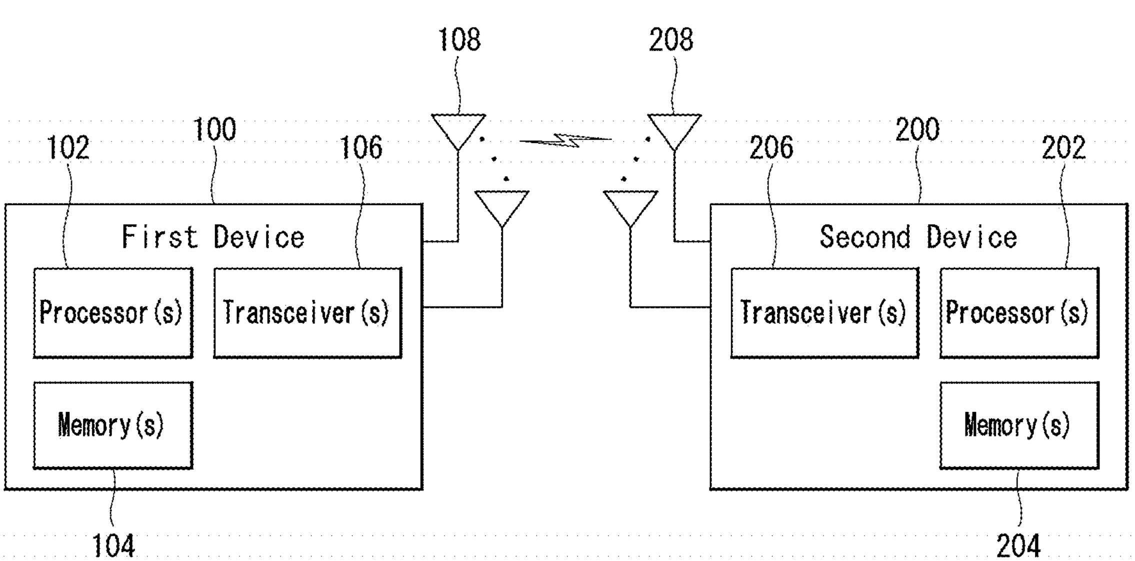

【FIG. 24】
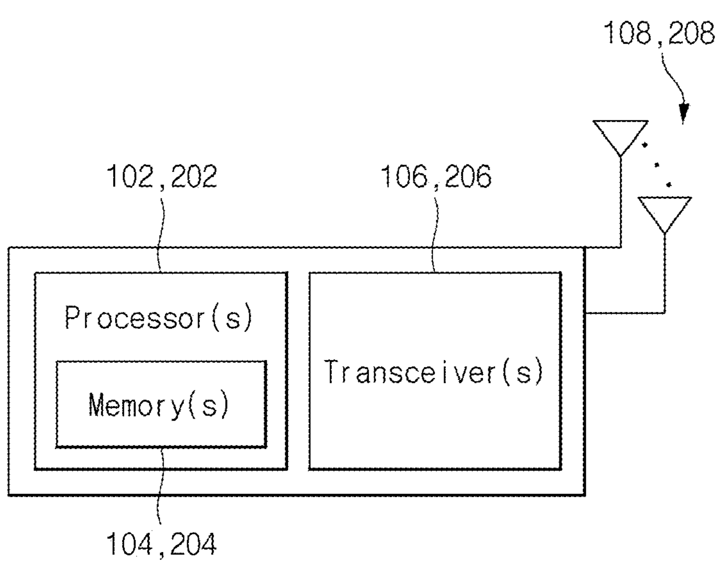

【FIG. 25】
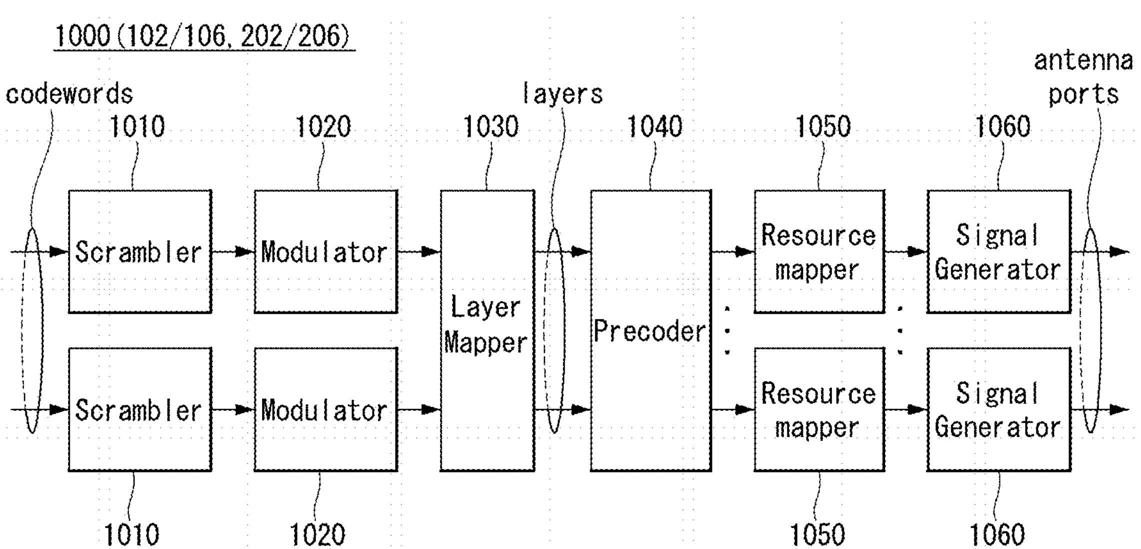

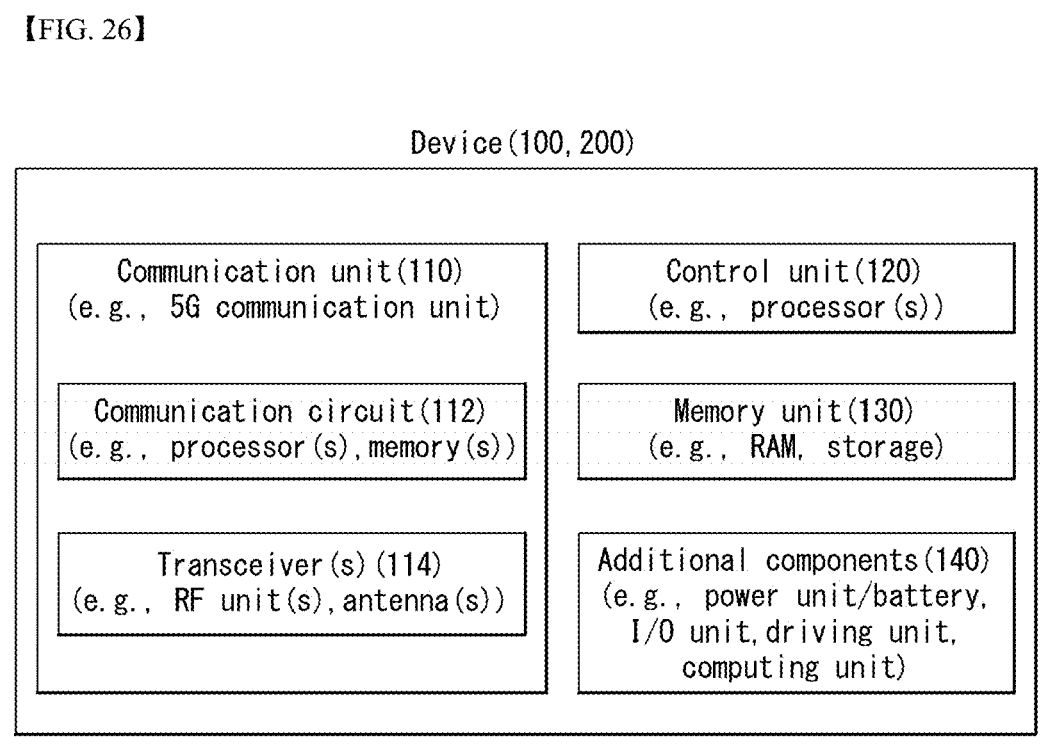

【FIG. 26】

【FIG. 27】
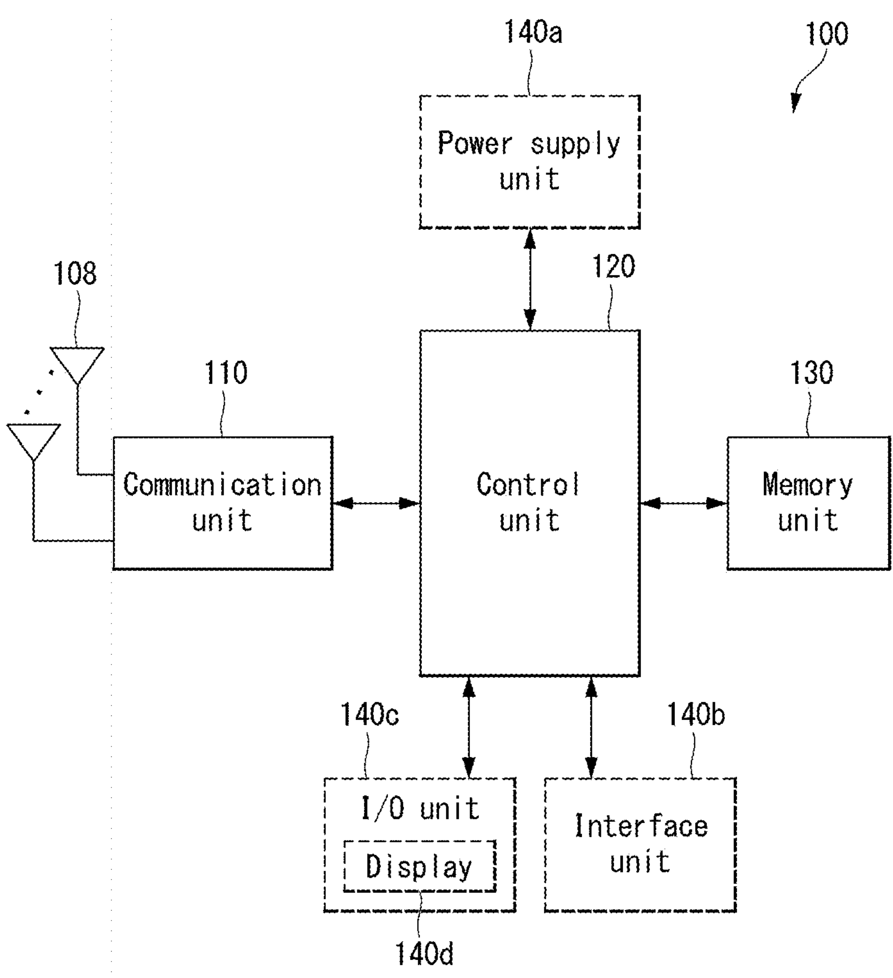

【FIG. 28】
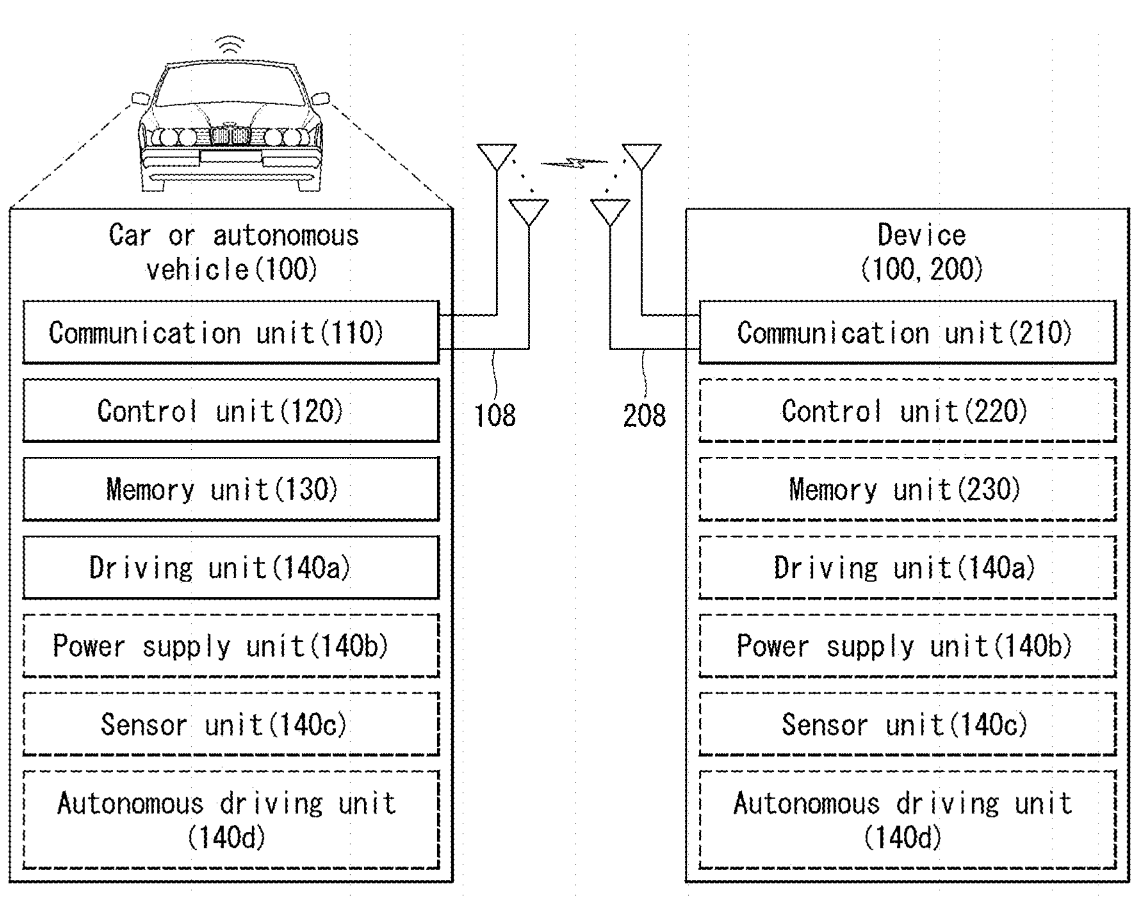

【FIG. 29】
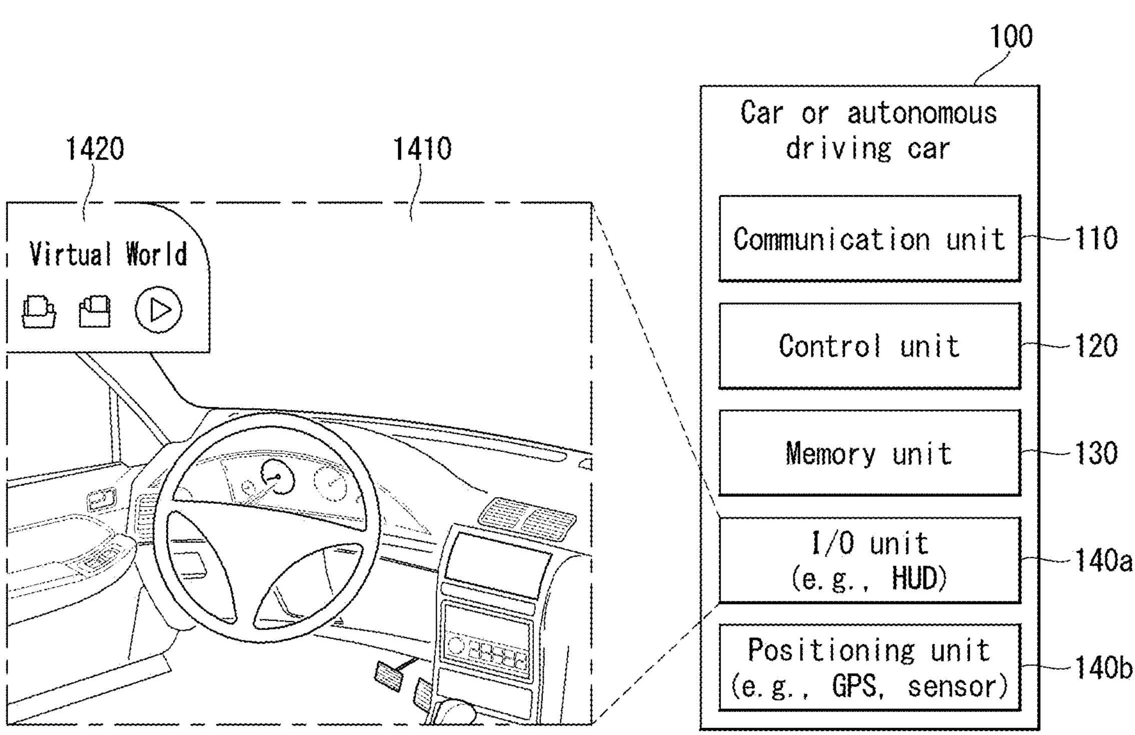

【FIG. 30】
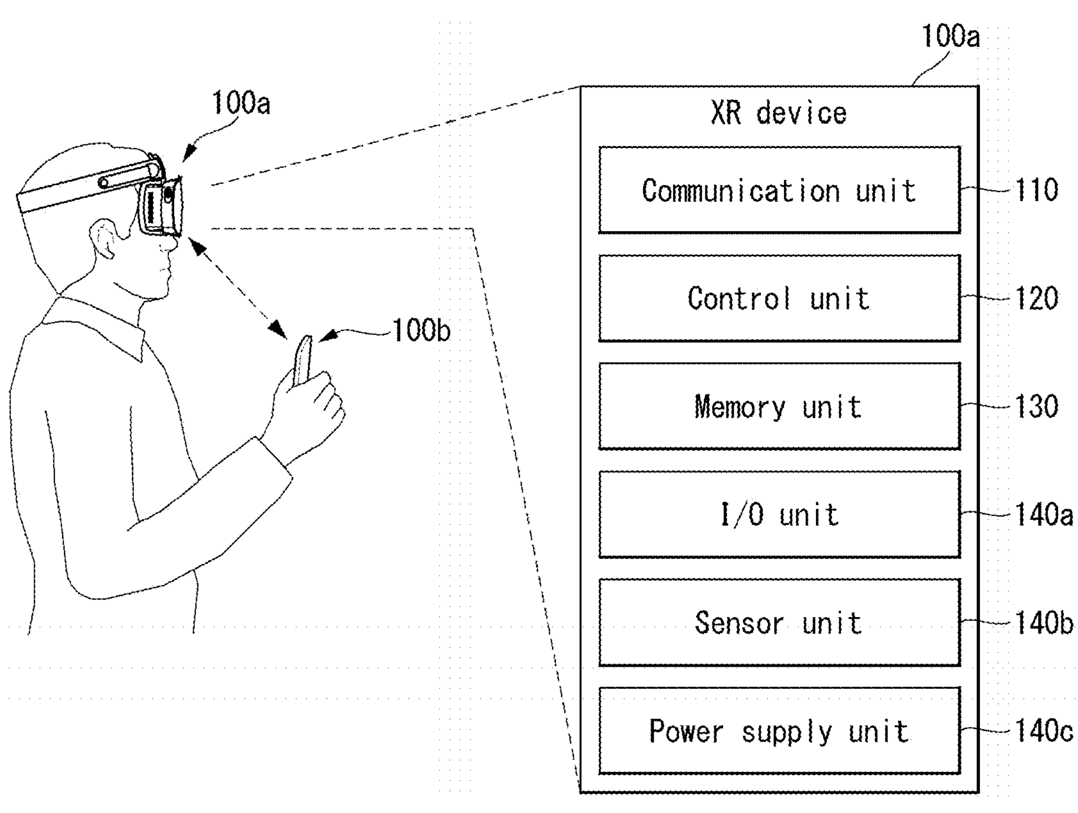

【FIG. 31】
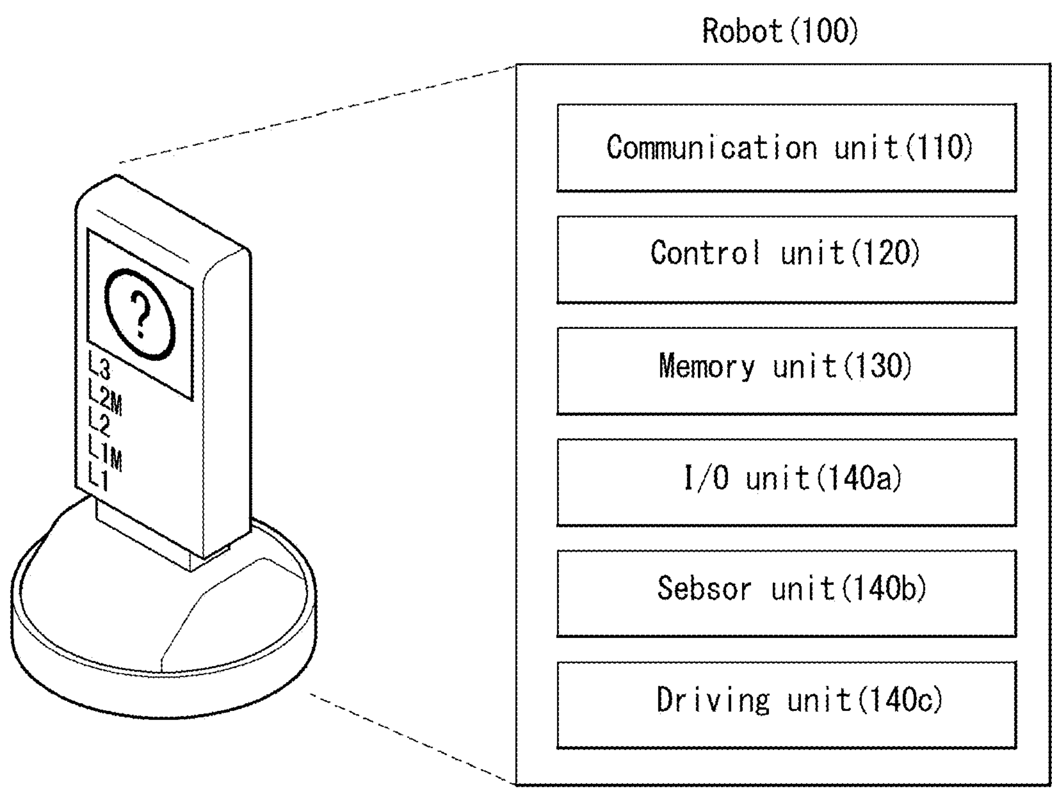

【FIG. 32】
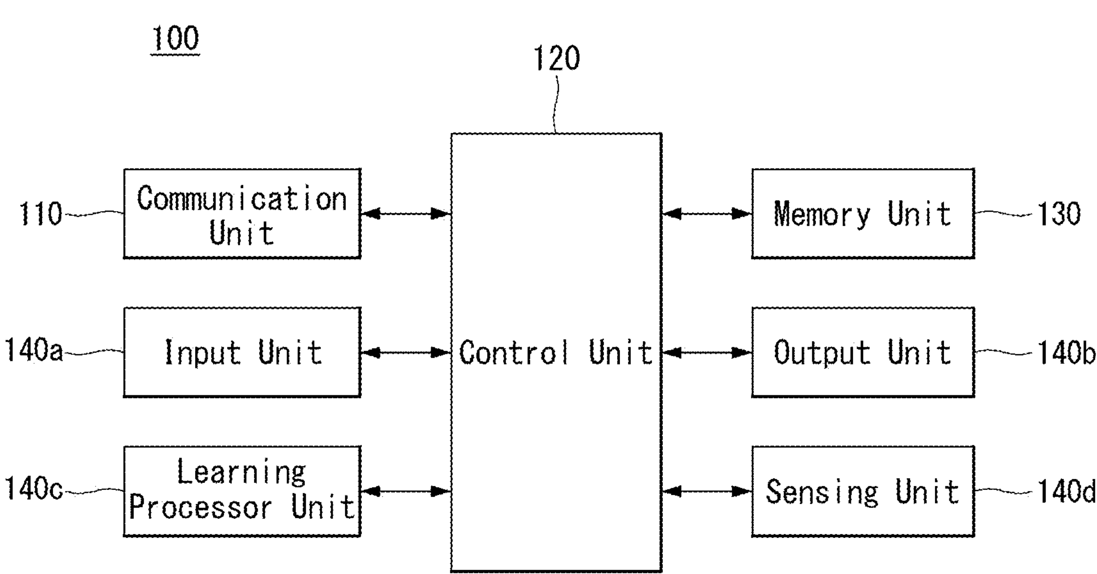

DEVICE AND METHOD FOR PERFORMING PRIORITY SETTING AND PROCESSING ON BASIS OF SEMANTIC MESSAGE TYPE IN SEMANTIC COMMUNICATION

CROSS-REFERENCE TO RELATED APPLICATION(S)

This application is the National Stage filing under 35 U.S.C. 371 of International Application No. PCT/KR2022/019114, filed on Nov. 29, 2022, which claims the benefit of earlier filing date and right of priority to Korean Application No. 10-2021-0177979, filed on Dec. 13, 2021, the contents of which are all incorporated by reference herein in their entirety.

TECHNICAL FIELD

The present disclosure relates to a communication system. More specifically, the present disclosure relates to a device and a method for priority setting and processing of a plurality of semantic messages based on semantic message types in semantic communication.

BACKGROUND ART

Since one of the various goals of 6G communication is to enable a variety of new services that interconnect people and machines with different levels of intelligence, it is necessary to move from approaches that deal solely with technical aspects to those that also consider semantic issues. In human communication, word information is related to the corresponding 'meaning' during information exchange. If the concept related to the message sent by a source is correctly interpreted at its destination, it may be considered that proper semantic communication has been established.

Existing studies assume no semantic mismatch and propose simple models without adequately considering updates to background knowledge and inference procedures and build an end-to-end systems lacking feedback mechanisms, resulting in the absence of a recovery procedure for semantic errors at the destination. Furthermore, existing studies do not address the generation, transmission, reception, and processing of more than N semantic messages during semantic communication; thus, semantic messages are handled simply in a First In, First Out (FIFO) manner.

When technologies to address the above issues are established, multiple types of semantic messages may be generated, transmitted, received, and processed, in which situation it is necessary to propose a process for setting priorities according to the message types and processing messages accordingly.

Also, it is necessary to propose a method for setting semantic message types and the corresponding procedure for message handling, which includes consideration for having conventional communication and semantic communication operate in a hybrid manner instead of having them operate separately and integration of the remaining semantic communication operations into part of the physical layer operations of the conventional communication.

DISCLOSURE

Technical Problem

To solve the problem above, the present disclosure provides a device and a method for priority setting and processing of a plurality of semantic messages based on semantic message types in semantic communication.

The present disclosure provides a device and a method for processing a semantic message based on the priority of the received semantic message by first checking flag bits corresponding to the semantic message type and identifying the type of semantic message that follows the flag bits.

The present disclosure provides a device and a method for setting priorities of various types of semantic messages by configuring RNTI and DCI formats for a semantic communication grant to identify the types of semantic messages, transmitting the grant with a semantic message or adding semantic message type check flag bits to the front of a finally generated semantic message.

Technical objects to be achieved by the present disclosure are not limited to the aforementioned technical objects, and other technical objects not described above may be evidently understood by a person having ordinary skill in the art to which the present disclosure pertains from the following description.

Technical Solution

According to various embodiments of the present disclosure, provided is a method for operating a first node in a communication system, the method comprising receiving one or more synchronization signals from a second node; receiving system information from the second node; receiving control information from the second node; receiving a plurality of first semantic messages including semantic data based on second background knowledge of the second node from the second node; identifying a first message type field in each of the plurality of first semantic messages; determining a priority of each of the plurality of first semantic messages based on the first message type field; processing each of the plurality of first semantic messages based on first background knowledge of the first node and the priority; generating a plurality of second semantic messages including a second message type field using the semantic data and the first background knowledge; and transmitting the plurality of second semantic messages to the second node.

According to various embodiments of the present disclosure, provided is a method for operating a second node in a communication system, the method comprising transmitting one or more synchronization signals to a first node; transmitting system information to the first node; transmitting control information to the first node; transmitting a plurality of first semantic messages including semantic data based on second background knowledge of the second node to the first node, wherein each of the plurality of first semantic messages includes a first message type field, and each of the plurality of first semantic messages is processed based on a first priority determined according to the first message type field and first background knowledge of the first node; receiving a plurality of second semantic messages generated using the semantic data and the first background knowledge from the first node; identifying a second message type field within each of the plurality of second semantic messages; determining a second priority of each of the plurality of second semantic messages based on the second message type field; and processing each of the plurality of second semantic messages based on the second background knowledge and the second priority.

According to various embodiments of the present disclosure, provided is a first node in a communication system, the first node comprising a transceiver and at least one processor, wherein the processor is configured to receive one or more synchronization signals from a second node; receive system information from the second node; receive control information from the second node; receive a plurality of first semantic messages including semantic data based on second background knowledge of the second node from the second node; identify a first message type field in each of the plurality of first semantic messages; determine a priority of each of the plurality of first semantic messages based on the first message type field; process each of the plurality of first semantic messages based on first background knowledge of the first node and the priority; generate a plurality of second semantic messages including a second message type field using the semantic data and the first background knowledge; and transmit the plurality of second semantic messages to the second node.

According to various embodiments of the present disclosure, provided is a second node in a communication system, the second node comprising a transceiver and at least one processor, wherein the processor is configured to transmit one or more synchronization signals to a first node; transmit system information to the first node; transmit control information to the first node; transmit a plurality of first semantic messages including semantic data based on second background knowledge of the second node to the first node, wherein each of the plurality of first semantic messages includes a first message type field, and each of the plurality of first semantic messages is processed based on a first priority determined according to the first message type field and first background knowledge of the first node; receive a plurality of second semantic messages generated using the semantic data and the first background knowledge from the first node; identify a second message type field within each of the plurality of second semantic messages; determine a second priority of each of the plurality of second semantic messages based on the second message type field; and process each of the plurality of second semantic messages based on the second background knowledge and the second priority.

According to various embodiments of the present disclosure, in one or more non-transitory computer-readable medium storing one or more commands, the one or more commands, based on being executed by one or more processors, perform operations, the operations comprising receiving one or more synchronization signals from a second node; receiving system information from the second node; receiving control information from the second node; receiving a plurality of first semantic messages including semantic data based on second background knowledge of the second node from the second node; identifying a first message type field in each of the plurality of first semantic messages; determining a priority of each of the plurality of first semantic messages based on the first message type field; processing each of the plurality of first semantic messages based on first background knowledge of the first node and the priority; generating a plurality of second semantic messages including a second message type field using the semantic data and the first background knowledge; and transmitting the plurality of second semantic messages to the second node.

According to various embodiments of the present disclosure, in one or more non-transitory computer-readable medium storing one or more commands, the one or more commands, based on being executed by one or more processors, perform operations, the operations comprising transmitting one or more synchronization signals to a first node; transmitting system information to the first node; transmitting control information to the first node; transmitting a plurality of first semantic messages including semantic data based on second background knowledge of the second node to the first node, wherein each of the plurality of first semantic messages includes a first message type field, and each of the plurality of first semantic messages is processed based on a first priority determined according to the first message type field and first background knowledge of the first node; receiving a plurality of second semantic messages generated using the semantic data and the first background knowledge from the first node; identifying a second message type field within each of the plurality of second semantic messages; determining a second priority of each of the plurality of second semantic messages based on the second message type field; and processing each of the plurality of second semantic messages based on the second background knowledge and the second priority.

Advantageous Effects

The present disclosure may provide a device and a method for priority setting and processing of a plurality of semantic messages based on semantic message types in semantic communication.

The present disclosure may provide a device and a method for processing a semantic message based on the priority of a received semantic message by first checking flag bits corresponding to the semantic message type and identifying the type of the semantic message that follows the flag bits.

The present disclosure may provide a device and a method for setting priorities of various types of semantic messages by configuring RNTI and DCI formats for semantic communication grant to identify the types of semantic messages, transmitting the grant with a semantic message or adding semantic message type check flag bits to the front of a finally generated semantic message.

The present disclosure may provide a device and a method for transmitting and receiving signals between semantic layers located at a source and a destination in a wireless communication system.

DESCRIPTION OF DRAWINGS

The accompany drawings, which are included to provide a further understanding of the present disclosure and are incorporated on and constitute a part of this specification, illustrate embodiments of the present disclosure and together with the description serve to explain the principles of the present disclosure. However, technical characteristics described in the present disclosure are not limited to specific drawings, and the characteristics disclosed in the respective drawings may be combined with each other to form a new embodiment. Reference numerals in each drawing may mean structural elements.

FIG. 1 illustrates one example of physical channels and typical signal transmission in the 3GPP system.

FIG. 2 illustrates a system structure of the New Generation Radio Access Network (NG-RAN).

FIG. 3 illustrates the functional division between NG-RAN and 5GC.

FIG. 4 illustrates an example of 5G use case scenario.

FIG. 5 illustrates one example of a communication structure that may be provided in the 6G system.

FIG. 6 briefly illustrates one example of the perceptron structure.

FIG. 7 briefly illustrates one example of the multi-layer perceptron structure.

FIG. 8 briefly illustrates an example of a deep neural network.

FIG. 9 briefly illustrates one example of a convolutional neural network.

FIG. 10 briefly illustrates one example of a filter operation in the convolutional neural network.

FIG. 11 briefly illustrates one example of a neural network structure including a recurrent loop.

FIG. 12 briefly illustrates one example of an operation structure of a recurrent neural network.

FIG. 13 illustrates one example of three levels of a communication model related to semantic communication in a system applicable to the present disclosure.

FIG. 14 illustrates one example of a source and a destination of semantic information in a system applicable to the present disclosure.

FIG. 15 illustrates one example of flag settings for identifying semantic message types at a source in a system applicable to the present disclosure.

FIG. 16 illustrates one example of checking flags for identifying semantic message types and processing of a semantic message at a destination in a system applicable to the present disclosure.

FIG. 17 illustrates one example of checking flags for identifying semantic message types and processing of a semantic message at a destination in a system applicable to the present disclosure.

FIG. 18 illustrates one example of a process of setting priorities for semantic message types and transmission and processing of semantic messages between a terminal and a base station in a system applicable to the present disclosure.

FIG. 19 illustrates one example of a process of setting priorities for semantic message types and transmission and processing of semantic messages between a first node and a second node in a system applicable to the present disclosure.

FIG. 20 illustrates one example of operation steps of a first node in a system applicable to the present disclosure.

FIG. 21 illustrates one example of operation steps of a second node in a system applicable to the present disclosure.

FIG. 22 illustrates a communication system (1) applied to various embodiments of the present disclosure.

FIG. 23 illustrates a wireless device applicable to various embodiments of the present disclosure.

FIG. 24 illustrates another example of a wireless device applicable to various embodiments of the present disclosure.

FIG. 25 illustrates a signal processing circuit for transmission signals.

FIG. 26 illustrates yet another example of a wireless device applicable to various embodiments of the present disclosure.

FIG. 27 illustrates a portable device applied to various embodiments of the present disclosure.

FIG. 28 illustrates a vehicle or a self-driving vehicle applied to various embodiments of the present disclosure.

FIG. 29 illustrates a vehicle applied to various embodiments of the present disclosure.

FIG. 30 illustrates an XR device applied to various embodiments of the present disclosure.

FIG. 31 illustrates a robot applied to various embodiments of the present disclosure.

FIG. 32 illustrates an AI device applied to various embodiments of the present disclosure.

MODE FOR DISCLOSURE

In various embodiments of the present disclosure, "A or B" may mean "only A," "only B" or "both A and B." In other words, in various embodiments of the present disclosure, "A or B" may be interpreted as "A and/or B." For example, in various embodiments of the present disclosure, "A, B or C" may mean "only A," "only B," "only C" or "any combination of A, B and C."

A slash (/) or comma used in various embodiments of the present disclosure may mean "and/or." For example, "A/B" may mean "A and/or B." Hence, "A/B" may mean "only A," "only B" or "both A and B." For example, "A, B, C" may mean "A, B, or C."

In various embodiments of the present disclosure, "at least one of A and B" may mean "only A," "only B" or "both A and B." In addition, in various embodiments of the present disclosure, the expression of "at least one of A or B" or "at least one of A and/or B" may be interpreted in the same meaning as "at least one of A and B."

Further, in various embodiments of the present disclosure, "at least one of A, B, and C" may mean "only A," "only B," "only C" or "any combination of A, B and C." In addition, "at least one of A, B or C" or "at least one of A, B and/or C" may mean "at least one of A, B, and C."

Further, parentheses used in various embodiments of the present disclosure may mean "for example." Specifically, when "control information (PDCCH)" is described, "PDCCH" may be proposed as an example of "control information." In other words, "control information" in various embodiments of the present disclosure is not limited to "PDCCH," and "PDDCH" may be proposed as an example of "control information." In addition, even when "control information (i.e., PDCCH)" is described, "PDCCH" may be proposed as an example of "control information."

Technical features described individually in one drawing in various embodiments of the present disclosure may be implemented individually or simultaneously.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro. 3GPP 6G may be an evolved version of 3GPP NR.

For clarity in the description, the following description will mostly focus on 3GPP communication system (e.g. LTE-A or 5G NR). However, technical features according to an embodiment of the present disclosure will not be limited only to this. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR/6G may be collectively referred to as the 3GPP system. For terms and techniques not specifically described among terms and techniques used in the present disclosure, reference may be made to a wireless communication standard document published before the present disclosure is filed. For example, the following document may be referred to.

3GPP LTE 36.211: Physical channels and modulation
36.212: Multiplexing and channel coding
36.213: Physical layer procedures
36.300: Overall description
36.331: Radio Resource Control (RRC)

3GPP NR 38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification Physical Channel and Frame Structure Physical Channel and General Signal Transmission FIG. 1 illustrates an example of physical channels and general signal transmission used for the 3GPP system.

In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S11). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S12).

When there is no radio resource first accessing the eNB or for signal transmission, the UE may perform a Random Access Procedure (RACH) to the eNB (S13 to S16). To this end, the UE may transmit a specific sequence to a preamble through a Physical Random Access Channel (PRACH) (S13 and S15) and receive a response message (Random Access Response (RAR) message) for the preamble through the PDCCH and a corresponding PDSCH. In the case of a contention based RACH, a Contention Resolution Procedure may be additionally performed (S16).

The UE that performs the above procedure may then perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

The control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

Structure of Uplink and Downlink Channels

Downlink Channel Structure

A base station transmits a related signal to a UE via a downlink channel to be described later, and the UE receives the related signal from the base station via the downlink channel to be described later.

(1) Physical Downlink Shared Channel (PDSCH)

A PDSCH carries downlink data (e.g., DL-shared channel transport block, DL-SCH TB) and is applied with a modulation method such as quadrature phase shift keying (QPSK), 16 quadrature amplitude modulation (QAM), 64 QAM, and 256 QAM. A codeword is generated by encoding TB. The PDSCH may carry multiple codewords. Scrambling and modulation mapping are performed for each codeword, and modulation symbols generated from each codeword are mapped to one or more layers (layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

A PDCCH carries downlink control information (DCI) and is applied with a QPSK modulation method, etc. One PDCCH consists of 1, 2, 4, 8, or 16 control channel elements (CCEs) based on an aggregation level (AL). One CCE consists of 6 resource element groups (REGs). One REG is defined by one OFDM symbol and one (P) RB.

The UE performs decoding (aka, blind decoding) on a set of PDCCH candidates to acquire DCI transmitted via the PDCCH. The set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

Uplink Channel Structure

A UE transmits a related signal to a base station via an uplink channel to be described later, and the base station receives the related signal from the UE via the uplink channel to be described later.

(1) Physical Uplink Shared Channel (PUSCH)

A PUSCH carries uplink data (e.g., UL-shared channel transport block, UL-SCH TB) and/or uplink control information (UCI) and is transmitted based on a CP-OFDM (Cyclic Prefix-Orthogonal Frequency Division Multiplexing) waveform, DFT-s-OFDM (Discrete Fourier Transform-spread-Orthogonal Frequency Division Multiplexing) waveform, or the like. When the PUSCH is transmitted based on the DFT-s-OFDM waveform, the UE transmits the PUSCH by applying a transform precoding. For example, if the transform precoding is not possible (e.g., transform precoding is disabled), the UE may transmit the PUSCH based on the CP-OFDM waveform, and if the transform precoding is possible (e.g., transform precoding is enabled), the UE may transmit the PUSCH based on the CP-OFDM waveform or the DFT-s-OFDM waveform. The PUSCH transmission may be dynamically scheduled by an UL grant within DCI, or may be semi-statically scheduled based on high layer (e.g., RRC) signaling (and/or layer 1 (L1) signaling (e.g., PDCCH)) (configured grant). The PUSCH transmission may be performed based on a codebook or a non-codebook.

(2) Physical Uplink Control Channel (PUCCH)

A PUCCH carries uplink control information, HARQ-ACK, and/or scheduling request (SR), and may be divided into multiple PUCCHs based on a PUCCH transmission length.

New radio access technology (RAT, NR) is described below.

As more and more communication devices require larger communication capacity, there is a need for enhanced mobile broadband communication compared to the existing radio access technology (RAT). Massive machine type communications (MTCs) which provide various services anytime and anywhere by connecting many devices and objects are also one of the major issues to be considered in next-generation communications. In addition, a communication system design considering a service/UE sensitive to reliability and latency is also being discussed. As above, the introduction of next generation radio access technology considering enhanced mobile broadband communication, massive MTC, ultra-reliable and low latency communication (URLLC), etc. is discussed, and the technology is called new RAT or NR for convenience in various embodiments of the present disclosure.

FIG. 2 illustrates system architecture of new generation radio access network (NG-RAN).

Referring to FIG. 2, the NG-RAN may include gNB and/or eNB providing user plane and control plane protocol terminations toward the UE. FIG. 2 illustrates an example where the NG-RAN includes only the gNB. The gNB and the eNB are interconnected via Xn interface. The gNB and the eNB are connected to the 5G core network (5GC) via NG interface. More specifically, the gNB and the eNB are connected to an access and mobility management function (AMF) via NG-C interface and connected to a user plane function (UPF) via NG-U interface.

FIG. 3 illustrates functional split between NG-RAN and 5GC.

Referring to FIG. 3, the gNB may provide functions including Inter Cell RRM, RB control, connection mobility control, radio admission control, measurement configuration and provision, dynamic resource allocation, etc. The AMF may provide functions including non-access stratum (NAS) security, idle state mobility processing, etc. The UPF may provide functions including mobility anchoring, protocol data unit (PDU) processing, etc. The session management function (SMF) may provide functions including UE IP address allocation, PDU session control, etc.

FIG. 4 illustrates an example of 5G usage scenario.

The 5G usage scenario illustrated in FIG. 4 is merely an example, and technical features according to various embodiments of the present disclosure can be applied to other 5G usage scenarios that are not illustrated in FIG. 4.

Referring to FIG. 4, three major requirement areas of 5G include (1) an enhanced mobile broadband (eMBB) area, (2) a massive machine type communication (mMTC) area and (3) an ultra-reliable and low latency communications (URLLC) area. Some use cases may require multiple areas for optimization, and other use case may focus only on one key performance indicator (KPI). 5G intends to support such diverse use cases in a flexible and reliable way.

eMBB focuses on across-the-board enhancements to the data rate, latency, user density, capacity and coverage of mobile broadband access. eMBB targets throughput of about 10 Gbps. eMBB goes far beyond basic mobile Internet access and covers rich interactive work, media and entertainment applications in the cloud or augmented reality. Data will be one of the key drivers for 5G and in new parts of this system we may for the first time see no dedicated voice service in the 5G era. In 5G, voice is expected to be handled as an application, simply using the data connectivity provided by the communication system. The main drivers for the increased traffic volume include an increase in size of content and an increase in the number of applications requiring high data transfer rates. Streaming service (audio and video), interactive video and mobile Internet connectivity will continue to be used more broadly as more devices connect to the Internet. Many of these applications require always-on connectivity to push real time information and notifications to the users. Cloud storage and applications are rapidly increasing for mobile communication platforms. This is applicable for both work and entertainment. Cloud storage is one particular use case driving the growth of uplink data transfer rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality for entertainment and information retrieval. The augmented reality requires very low latencies and significant instant data volumes.

mMTC is designed to enable communication between devices that are low-cost, massive in number and battery-driven, and is intended to support applications such as smart metering, logistics, and field and body sensors. mMTC targets batteries with a lifespan of about 10 years and/or about 1 million devices per km2. mMTC enables to smoothly connect embedded sensors in all fields and is one of the most expected 5G use case. It is predicted that IoT devices will potentially reach 20.4 billion by 2020. Industrial IoT is one area where 5G will play a major role, enabling smart cities, asset tracking, smart utilities, agriculture, and security infrastructure.

URLLC will make it possible for devices and machines to communicate with ultra-reliability, very low latency and high availability, making it ideal for vehicular communication, industrial control, factory automation, remote surgery, smart grids and public safety applications. URLLC targets latency of about 1 ms. URLLC includes new services that will transform industries with ultra-reliable/low latency links like remote control of critical infrastructure and an autonomous vehicle. The level of reliability and latency is vital to smart grid control, industrial automation, robotics, and drone control and coordination.

Next, multiple use cases included within the triangle of FIG. 4 are described in more detail.

5G may supplement fiber-to-the-home (FTTH) and cable-based broadband (or DOCSIS) as means for providing a stream evaluated from gigabits per second to several hundreds of megabits per second. Such fast speed may be necessary to deliver TV with resolution of 4K or more (6K, 8K or more) in addition to virtual reality (VR) and augmented reality (AR). VR and AR applications include immersive sports games. A specific application may require special network configuration. For example, in the VR game, in order for game companies to minimize latency, a core server may need to be integrated with an edge network server of a network operator.

The automotive sector is expected to be an important new driver for 5G, along with many use cases for mobile communications for vehicles. For example, entertainment for passengers requires high capacity and high mobile broadband at the same time. The reason for this is that future users will expect to continue their good quality connection independent of their location and speed. Other use cases for the automotive sector are augmented reality dashboards. The augmented reality dashboards display overlay information on top of what a driver is seeing through the front window through the augmented reality dashboards, identifying objects in the dark and telling the driver about the distances and movements of the objects. In the future, wireless modules will enable communication between vehicles, information exchange between vehicles and supporting infrastructure, and information exchange between vehicles and other connected devices (e.g., devices carried by pedestrians). Safety systems guide drivers on alternative courses of action to allow them to drive more safely and lower the risks of accidents. A next phase will be a remotely controlled vehicle or an autonomous vehicle. This requires ultra reliable and very fast communication between different autonomous vehicles and/or between vehicles and infrastructure. In the future, an autonomous vehicle may take care of all driving activity, allowing the driver to rest and concentrate only on traffic anomalies that the vehicle itself cannot identify. The technical requirements for autonomous vehicles require for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost and energy-efficient maintenance of the city or home. A similar setup can be done for each home, where temperature sensors, window and heating controllers, burglar alarms and home appliances are all connected wirelessly. Many of these sensors are typically low data rate, low power and low cost. However, for example, real time HD video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information can include the behaviors of suppliers and consumers, allowing the smart grid to improve the efficiency, reliability, economics and sustainability of the production and distribution of fuels such as electricity in an automated fashion. A smart grid can be seen as another sensor network with low delays.

The health sector has many applications that can benefit from mobile communications. Communications systems enable telemedicine, which provides clinical health care at a distance. It helps eliminate distance barriers and can improve access to medical services that would often not be consistently available in distant rural communities. It is also used to save lives in critical care and emergency situations. Wireless sensor networks based on mobile communication can provide remote monitoring and sensors for parameters such as heart rate and blood pressure.

Wireless and mobile communications are becoming increasingly important for industrial application. Wires are expensive to install and maintain. Therefore, the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Logistics and freight tracking are important use cases for mobile communications that enable the tracking of inventory and packages wherever they are through using location based information systems. The logistics and freight use cases typically require lower data rates but need wide coverage and reliable location information.

Examples of next generation communication (e.g., 6G) that can be applied to various embodiments of the present disclosure are described below.

6G System General

A 6G (wireless communication) system has purposes such as (i) a very high data rate per device, (ii) a very large number of connected devices, (iii) global connectivity, (iv) a very low latency, (v) a reduction in energy consumption of battery-free IoT devices, (vi) ultra-reliable connectivity, and (vii) connected intelligence with machine learning capability. The vision of the 6G system may include four aspects such as intelligent connectivity, deep connectivity, holographic connectivity, and ubiquitous connectivity, and the 6G system may satisfy the requirements shown in Table 1 below. That is, Table 1 shows an example of the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion, and enhanced data security.

FIG. 5 illustrates an example of a communication structure providable in a 6G system.

The 6G system is expected to have 50 times greater simultaneous wireless communication connectivity than a 5G wireless communication system. URLLC, which is the key feature of 5G, will become more important technology by providing an end-to-end latency less than 1 ms in 6G communication. The 6G system may have much better volumetric spectrum efficiency unlike frequently used domain spectrum efficiency. The 6G system can provide advanced battery technology for energy harvesting and very long battery life, and thus mobile devices may not need to be separately charged in the 6G system. In 6G, new network characteristics may be as follows.

- Satellites integrated network: To provide a global mobile group, 6G will be integrated with satellite. Integration of terrestrial, satellite and public networks into one wireless communication system is critical for 6G.
- Connected intelligence: Unlike the wireless communication systems of previous generations, 6G is innovative and may update wireless evolution from “connected things” to “connected intelligence”. AI may be applied in each step (or each signal processing procedure to be described later) of a communication procedure.

Seamless integration of wireless information and energy transfer: A 6G wireless network may transfer power to charge batteries of devices such as smartphones and sensors. Therefore, wireless information and energy transfer (WIET) will be integrated.

Ubiquitous super 3D connectivity: Access to networks and core network functions of drone and very low earth orbit satellite will establish super 3D connectivity in 6G ubiquitous.

In the new network characteristics of 6G described above, several general requirements may be as follows.

Small cell networks: The idea of a small cell network has been introduced to improve received signal quality as a result of throughput, energy efficiency, and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network consisting of heterogeneous networks improves overall QoS and reduces costs.

High-capacity backhaul: Backhaul connectivity is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability. Further, billions of devices can be shared on a shared physical infrastructure.

Core Implementation Technology of 6G System

Artificial Intelligence (AI)

Technology which is most important in the 6G system and will be newly introduced is AI. AI was not involved in the 4G system. The 5G system will support partial or very limited AI. However, the 6G system will support AI for full automation. Advance in machine learning will create a more intelligent network for real-time communication in 6G. When AI is introduced to communication, real-time data transmission can be simplified and improved. AI may determine a method of performing complicated target tasks using countless analysis. That is, AI can increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, and in particular, deep learning has been focused on the wireless resource management and allocation field. However, such studies have been gradually developed to the MAC layer and the physical layer, and in particular, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. The machine learning may also be used for antenna selection, power control, symbol detection, etc. in the MIMO system.

However, application of a deep neutral network (DNN) for transmission in the physical layer may have the following problems.

A deep learning based AI algorithm requires a lot of training data in order to optimize training parameters. However, due to limitations in acquiring data in a specific channel environment as the training data, a lot of training data is used offline. Static training for the training data in the specific channel environment may cause a contradiction between the diversity and dynamic characteristics of a radio channel.

Currently, the deep learning mainly targets real signals. However, signals of the physical layer of wireless communication are complex signals. For matching of the characteristics of a wireless communication signal, studies on a neural network for detecting a complex domain signal are further required.

Hereinafter, machine learning is described in more detail.

Machine learning refers to a series of operations to train a machine in order to create a machine capable of doing tasks that people cannot do or are difficult for people to do. Machine learning requires data and learning models. In the machine learning, a data learning method may be roughly divided into three methods, that is, supervised learning, unsupervised learning and reinforcement learning.

Neural network learning is to minimize an output error. The neural network learning refers to a process of repeatedly inputting training data to a neural network, calculating an error of an output and a target of the neural network for the training data, backpropagating the error of the neural network from an output layer to an input layer of the neural network for the purpose of reducing the error, and updating a weight of each node of the neural network.

The supervised learning may use training data labeled with a correct answer, and the unsupervised learning may use training data which is not labeled with a correct answer. That is, for example, in supervised learning for data classification, training data may be data in which each training data is labeled with a category. The labeled training data may be input to the neural network, and the error may be calculated by comparing the output (category) of the neural network with the label of the training data. The calculated error is backpropagated in the neural network in the reverse direction (i.e., from the output layer to the input layer), and a connection weight of respective nodes of each layer of the neural network may be updated based on the backpropagation. Change in the updated connection weight of each node may be determined depending on a learning rate. The calculation of the neural network for input data and the backpropagation of the error may construct a learning cycle (epoch). The learning rate may be differently applied based on the number of repetitions of the learning cycle of the neural network. For example, in the early stage of learning of the neural network, efficiency can be increased by allowing the neural network to rapidly ensure a certain level of performance using a high learning rate, and in the late of learning, accuracy can be increased using a low learning rate.

The learning method may vary depending on the feature of data. For example, in order for a reception end to accurately predict data transmitted from a transmission end on a communication system, it is preferable that learning is performed using the supervised learning rather than the unsupervised learning or the reinforcement learning.

The learning model corresponds to the human brain and may be regarded as the most basic linear model. However, a paradigm of machine learning using, as the learning model, a neural network structure with high complexity, such as artificial neural networks, is referred to as deep learning.

Neural network cores used as the learning method may roughly include a deep neural network (DNN) method, a convolutional deep neural network (CNN) method, and a recurrent Boltzmann machine (RNN) method.

The artificial neural network is an example of connecting several perceptrons.

FIG. 6 illustrates an example of a structure of a perceptron.

Referring to FIG. 6, when an input vector x=(x1, x2, . . . , xd) is input, each component is multiplied by a weight (W1, W2, . . . , Wd), and all the results are summed. After that, the entire process of applying an activation function $\sigma(\cdot)$ is called a perceptron. The huge artificial neural network structure may extend the simplified perceptron structure illustrated in FIG. 6 to apply the input vector to different multidimensional perceptrons. For convenience of explanation, an input value or an output value is referred to as a node.

The perceptron structure illustrated in FIG. 6 may be described as consisting of a total of three layers based on the input value and the output value. FIG. 7 illustrates an artificial neural network in which the number of (d+1) dimensional perceptrons between a first layer and a second layer is H, and the number of (H+1) dimensional perceptrons between the second layer and a third layer is K, by way of example.

FIG. 7 illustrates an example of a structure of a multilayer perceptron.

A layer where the input vector is located is called an input layer, a layer where a final output value is located is called an output layer, and all layers located between the input layer and the output layer are called a hidden layer. FIG. 7 illustrates three layers, by way of example. However, since the number of layers of the artificial neural network is counted excluding the input layer, it can be seen as a total of two layers. The artificial neural network is constructed by connecting the perceptrons of a basic block in two dimensions.

The above-described input layer, hidden layer, and output layer can be jointly applied in various artificial neural network structures, such as CNN and RNN to be described later, as well as the multilayer perceptron. The greater the number of hidden layers, the deeper the artificial neural network is, and a machine learning paradigm that uses the sufficiently deep artificial neural network as a learning model is called deep learning. In addition, the artificial neural network used for deep learning is called a deep neural network (DNN).

FIG. 8 illustrates an example of a deep neural network.

The deep neural network illustrated in FIG. 8 is a multilayer perceptron consisting of eight hidden layers+eight output layers. The multilayer perceptron structure is expressed as a fully connected neural network. In the fully connected neural network, a connection relationship does not exist between nodes located at the same layer, and a connection relationship exists only between nodes located at adjacent layers. The DNN has a fully connected neural network structure and is composed of a combination of multiple hidden layers and activation functions, so it can be usefully applied to understand correlation characteristics between input and output. The correlation characteristic may mean a joint probability of input and output.

Based on how the plurality of perceptrons are connected to each other, various artificial neural network structures different from the above-described DNN can be formed.

FIG. 9 illustrates an example of a structure of a convolutional neural network.

In the DNN, nodes located inside one layer are arranged in a one-dimensional longitudinal direction. However, in FIG. 9, it may be assumed that w nodes horizontally and h nodes vertically are arranged in two dimensions (convolutional neural network structure of FIG. 9). In this case, since in a connection process leading from one input node to the hidden layer, a weight is given for each connection, a total of h×w weights needs to be considered. Since there are h×w nodes in the input layer, a total of h2w2 weights are required between two adjacent layers.

The convolutional neural network of FIG. 9 has a problem in that the number of weights increases exponentially depending on the number of connections. Therefore, instead of considering the connections of all the nodes between adjacent layers, it is assumed that a small-sized filter exists, and a weighted sum and an activation function calculation are performed on an overlap portion of the filters as illustrated in FIG. 10.

FIG. 10 illustrates an example of a filter operation of a convolutional neural network.

One filter has a weight corresponding to the number as much as its size, and learning of the weight may be performed so that a certain feature on an image can be extracted and output as a factor. In FIG. 10, a filter having a size of 3×3 is applied to the upper leftmost 3×3 area of the input layer, and an output value obtained by performing a weighted sum and an activation function calculation for a corresponding node is stored in z22.

The filter performs the weighted sum and the activation function calculation while moving horizontally and vertically by a predetermined interval when scanning the input layer, and places the output value at a location of a current filter. This calculation method is similar to the convolution operation on images in the field of computer vision. Thus, a deep neural network with this structure is referred to as a convolutional neural network (CNN), and a hidden layer generated as a result of the convolution operation is referred to as a convolutional layer. In addition, a neural network in which a plurality of convolutional layers exists is referred to as a deep convolutional neural network (DCNN).

At the node where a current filter is located at the convolutional layer, the number of weights may be reduced by calculating a weighted sum including only nodes located in an area covered by the filter. Hence, one filter can be used to focus on features for a local area. Accordingly, the CNN can be effectively applied to image data processing in which a physical distance on the 2D area is an important criterion. In the CNN, a plurality of filters may be applied immediately before the convolution layer, and a plurality of output results may be generated through a convolution operation of each filter.

There may be data whose sequence characteristics are important depending on data attributes. A structure, in which a method of inputting one element on the data sequence at each time step considering a length variability and a relationship of the sequence data and inputting an output vector (hidden vector) of a hidden layer output at a specific time step together with a next element on the data sequence is applied to the artificial neural network, is referred to as a recurrent neural network structure.

FIG. 11 illustrates an example of a neural network structure in which a circular loop exists.

Referring to FIG. 11, a recurrent neural network (RNN) is a structure in which in a process of inputting elements (x1(t), x2(t), . . . , xd(t)) of any line of sight 't' on a data sequence to a fully connected neural network, hidden vectors (z1(t−1), z2(t−1), . . . , zH(t−1)) are input together at an immediately previous time step (t−1) to apply a weighted sum and an activation function. A reason for transferring the hidden vectors at a next time step is that information within the input vector in previous time steps is considered to be accumulated on the hidden vectors of a current time step.

FIG. 12 illustrates an example of an operation structure of a recurrent neural network.

Referring to FIG. 12, the recurrent neural network operates in a predetermined order of time with respect to an input data sequence.

Hidden vectors (z1(1), z2(1), . . . , zH(1)) when input vectors (x1(t), x2(t), . . . , xd(t)) at a time step 1 are input to the recurrent neural network, are input together with input vectors (x1(2), x2(2), . . . , xd(2)) at a time step 2 to determine vectors (z1(2), z2(2), . . . , zH(2)) of a hidden layer through a weighted sum and an activation function. This process is repeatedly performed at time steps 2, 3, . . . , T.

When a plurality of hidden layers are disposed in the recurrent neural network, this is referred to as a deep recurrent neural network (DRNN). The recurrent neural network is designed to be usefully applied to sequence data (e.g., natural language processing).

A neural network core used as a learning method includes various deep learning methods such as a restricted Boltzmann machine (RBM), a deep belief network (DBN), and a deep Q-network, in addition to the DNN, the CNN, and the RNN, and may be applied to fields such as computer vision, speech recognition, natural language processing, and voice/signal processing.

Recently, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver, rather than a traditional communication framework in the fundamental signal processing and communication mechanism. For example, deep learning-based channel coding and decoding, deep learning-based signal estimation and detection, deep learning-based MIMO mechanism, AI-based resource scheduling and allocation, and the like, may be included.

Terahertz (THz) Communication

A data transfer rate can be increased by increasing the bandwidth. This can be performed by using sub-TH communication as a wide bandwidth and applying advanced massive MIMO technology. THz waves, which are known as sub-millimeter radiation, generally indicate a frequency band between 0.1 THz and 10 THz with the corresponding wavelengths in the range of 0.03 mm-3 mm. A band range of 100 GHz to 300 GHz (sub THz band) is regarded as a main part of the THz band for cellular communication. When the sub-THz band is added to the mm Wave band, the 6G cellular communication capacity increases. 300 GHz-3 THz among the defined THz band is in a far infrared (IR) frequency band. Although the 300 GHz-3 THz band is part of the optical band, it is at the border of the optical band and is immediately after the RF band. Therefore, this 300 GHz-3 THz band shows similarity with RF.

Detailed Descriptions on Various Embodiments of the Present Disclosure

In what follows, various embodiments of the present disclosure will be described in detail.

The present disclosure relates to a method and a device used for semantic communication.

The symbols/abbreviations/terms used in the present disclosure are as follows.

AI: Artificial Intelligence

ML: Machine Learning

NN: Neural Network

DNN: Deep Neural Network

Prior Art of Various Embodiments of the Present Disclosure

FIG. 13 illustrates one example of three levels of a communication model related to semantic communication in a system applicable to the present disclosure.

Shannon and Weaber pointed out problems related to communication at three levels. (References: [1] SHANNON, C. E. A mathematical theory of communication. Bell System Technical Journal 27(1948), 379-423, 625-56. [2] WEAVER, W. The Mathematical Theory of Communication. 1949, Recent Contributions to the Mathematical Theory of Communication)

(1) Level A: How accurately can the symbols in communication be transmitted? (technical problem)

(2) Level B: How precisely do the transmitted symbols convey the desired meaning? (semantic problem)

(3) Level C: How effectively does the received meaning affect conduct in the desired way? (effectiveness problem)

While Shannon's information theory only focuses on level A problem and therefore does not consider communication from a semantic perspective, Weaver pointed out that Shannon's information theory is general enough to be extended to consider problems at levels B and C by adding "semantic transmitter", "semantic receiver" and "semantic noise" to Shannon's communication model. FIG. 13 is an overview describing the background of the problems.

FIG. 14 illustrates one example of a source and a destination of semantic information in a system applicable to the present disclosure.

Since one of the various goals of 6G communication is to enable a variety of new services that interconnect people and machines with different levels of intelligence, it is necessary to move from approaches that deal solely with technical aspects to those that also consider semantic issues.

In human communication, word information is related to the corresponding 'meaning' during information exchange. As indicated in FIG. 13, if the concept related to the message sent by a source is correctly interpreted at the destination, it may be considered that proper semantic communication has been established. FIG. 14 illustrates the characteristics of semantic communication corresponding to level B problem of FIG. 13.

However, existing studies assume no semantic mismatch and propose a simple model (where $k_s = K_r$, $I_s = I_r$ in FIG. 14); the proposed model does not consider updates to background knowledge and inference procedures nor does it include a procedure for recovering from semantic errors at the destination, resulting in an end-to-end system without a feedback mechanism.

To address the issues above, previous studies have proposed solutions involving four types of semantic messages. At this time, semantic messages corresponding to types 3 and 4 are used in situations where the source and the destination have different background knowledge but perform the same target task (prediction task).

Type 1: A semantic message containing the meaning that the source attempts to transmit to the destination.

Type 2: A semantic message for updating background knowledge/inference procedure between the source and the destination.

Type 3: A semantic feedback message providing the result of the destination's interpretation of the meaning transmitted within a semantic message received from the source.

Type 4: A semantic redundancy message used together with a semantic message previously transmitted by the source to help the destination correctly interpret the source's meaning when the interpretation result information included in the semantic feedback message differs from the source's intended meaning.

Also, a closer examination of the operational environment for semantic communication illustrated in FIGS. 13 and 14 reveals the following. In various embodiments of the present disclosure, the term 'device' refers to equipment capable of semantic communication, such as a user equipment (UE), a base station, and a server.

(1) Each device may function as both a source and a destination.

(2) 1:1/1:N (or N:1)/N:N communication is allowed.

(3) Depending on the number of entities participating in 1:1/1:N (or N:1)/N:N communication, a single device may receive N or more semantic messages from N devices. Since a procedure related to the generation, transmission, or feedback of semantic messages and a procedure related to updating background knowledge/an inference procedure may be performed in parallel, one device may receive N or more semantic messages from the viewpoint of message reception.

Existing prior studies do not consider generation, transmission, reception, and processing of N or more semantic messages when semantic communication is performed.

Therefore, semantic messages are basically processed in the First In, First Out (FIFO) scheme; when multiple semantic messages of the four semantic message types are generated, transmitted, received, or processed at the same time, it is necessary to establish a process for setting priorities according to their types and processing the messages accordingly.

Also, it is necessary to propose a method for setting semantic message types and the corresponding procedure for message handling, which includes consideration for having conventional communication and semantic communication operate in a hybrid manner instead of having them operate separately and integration of the remaining semantic communication operations into part of the physical layer operations of the conventional communication.

According to one embodiment of the present disclosure, a semantic layer, a new layer that manages overall operations for semantic data and semantic messages, may be added. The semantic layer is designed for a task-oriented semantic communication system and may be used to generate signals and exchange signals between a source and a destination. To communicate through the semantic layer, it may be necessary to define a protocol, which includes specifications between layers and a series of operational processes.

Configuration of Various Embodiments of the Present Disclosure

The present disclosure proposes a procedure for setting priorities of various semantic message types used in the semantic communication operations of a source and a destination that transmit and receive a plurality of semantic messages and processing semantic messages according to the established priorities in a system capable of performing semantic communication.

The system dealt with in the present disclosure pertains to the semantic level corresponding to level B in FIG. 13; as shown in FIG. 14, the source and the destination each possess their own world model, background knowledge, inference procedure, message generator, and message interpreter.

The present disclosure may perform initial settings stored within a device or obtained through communication between the device and a base station; the present disclosure assumes that a common model used for generating a semantic message by the source and the destination exists within the initial settings. Also, when semantic communication is performed after the initial setting, it is assumed that the source and the destination each use their own background knowledge and inference procedure but share the same target task, which is performed using the interpreted messages as input.

First, depending on the type of semantic message that may be generated, transmitted, received, or processed at the source and the destination, the order of priorities and their names may be defined as follows. In what follows, the smaller the priority number, the higher the priority.

(Background Knowledge Update Message for Semantic Communication)

Priority 1: A semantic message for background knowledge and inference procedure update between a source and a destination (background knowledge update message for semantic communication).

Priority 2: A semantic redundancy message used together with the semantic message previously transmitted by the source to help the destination correctly interpret the source's intended meaning when the interpretation result information included in the semantic feedback message differs from the source's intended meaning.

Priority 3: A semantic feedback message providing the result of the destination's interpretation of the meaning transmitted within a semantic message received from the source.

Priority 4: A semantic message containing the meaning that the source attempts to transmit to the destination (normal semantic message).

The priorities above have been set based on the following reasons.

Reason 1: During semantic communication, when the destination receives a semantic message from the source, the destination's background knowledge and inference procedure are used to interpret the transmitted meaning. At this time, by periodically transmitting and receiving semantic messages corresponding to priority 1, the background knowledge between the source and the destination may be updated, and based on the updated background knowledge, the inference procedure may also be updated. If the background knowledge is determined to exceed more than a predetermined similarity threshold using the semantic messages of priority 1 transmitted at predetermined intervals, the task (target task) related to interpreting the concept transmitted through the semantic message may correctly interpret the intended meaning using the inference procedure updated through learning based on the background knowledge and a semantic decoder. This may indicate that semantic errors due to semantic mismatch may be eliminated, obviating the need to generate and transmit messages corresponding to priorities 2 and 3 (i.e., there is no need to transmit semantic messages due to an additional procedure), thereby helping to reduce consumption of resources used for generating, transmitting, receiving, and processing the corresponding semantic messages.

Reason 2: Since a semantic redundancy message corresponding to priority 2 is received when the normal semantic message, corresponding to priority 4, previously transmitted from the source is not correctly interpreted as intended by the source, the semantic redundancy message should have priority higher than the semantic feedback message corresponding to priority 3 considering that semantic messages left at the destination due to previous misinterpretation need to be processed.

Reason 3: By receiving a semantic feedback message corresponding to priority 3, the source may determine whether the destination has correctly interpreted the meaning transmitted by the source and determine which semantic message to generate and transmit (a semantic message corresponding to priority 2 or priority 4); therefore, the semantic message corresponding to priority 3 should have a higher priority than the semantic message corresponding to priority 4. At this point, after the source receives the semantic feedback message, the semantic message that the source may generate and transmit is divided into the following cases:

Case A: If it is determined that the destination has failed to correctly interpret the meaning transmitted by the source, a semantic redundancy message corresponding to priority 2 may be generated and transmitted to the destination; this enables the destination to use the semantic redundancy message together with the semantic message previously transmitted by the source and to achieve a more accurate interpretation of meaning intended by the source; and Case B: If the destination successfully interprets the meaning transmitted by the source, a normal semantic message corresponding to priority 4, which includes the meaning to be transmitted next by the source, is generated or transmitted.

The following describes a method for setting priority for each semantic message type according to the descriptions above and transmitting specifics related to the priorities. As described above, the method may take into account a scenario in which conventional communication operates with semantic communication in a hybrid manner and a scenario in which semantic communication integrates the remaining semantic communication operations into part of the physical layer operations of conventional communication. To deal with the scenarios above, two methods may be mainly introduced.

Method 1: When communication between a device and a base station/server capable of setting a grant is performed, a new field is allocated in the DCI format within the grant for semantic messages.

Method 2: After a semantic message that includes the meaning the source intends to transmit to the destination is generated, semantic message type check flag bits are additionally set and attached before the corresponding semantic message.

In conventional communication, to transmit data from a device capable of generating a grant (e.g., a base station) used for resource allocation to another device performing communication, resource allocation according to the size of the data to be transmitted is necessary. At this time, when a device capable of performing conventional communication may also perform semantic communication in a hybrid manner, it is necessary to distinguish whether the information being transmitted from the corresponding device to another device is data for conventional communication or a message used for semantic communication.

At this time, a new grant for semantic communication may be established, and a new type of RNTI may be needed to distinguish the newly established grant. Also, since the DCI format included in the grant information used for resource allocation is used to distinguish various types of information, the device receiving the grant by newly adding the DCI format for semantic communication may check the DCI format to identify the type of semantic message transmitted together.

Table 2 below describes newly defined radio network temporary identifier (RNTI) for semantic communication. Specifically, Table 2 illustrates an example of RNTI value/usage for semantic communication.

Table 3 describes newly defined DCI format for semantic communication. Specifically, Table 3 illustrates an example of DCI format for semantic communication.

By changing the type of RNTI used in the conventional communication, the corresponding RNTI value may be updated, and the field/bits within the DCI format may be updated by adding a function related to semantic communication and by increasing the number of semantic message types.

TABLE 2

| Value (Hexa-decimal) | RNTI | Usage |
|---|---|---|
| FFF0 | SC-RNTI (semantic communication-RNTI) | Semantic message transmission for semantic communication |
| . . . | . . . | . . . |

TABLE 3

| Field (Item) | Bits | Reference |
|---|---|---|
| Semantic message type | 2 | 00: Normal semantic message<br>01: Semantic feedback message<br>10: Semantic redundancy message<br>11: Background knowledge update message for semantic communication |
| . . . | . . . | . . . |

At this time, when a device capable of generating a grant generates a plurality of semantic messages, a grant may be generated according to the semantic messages based on predetermined priorities, and the generated grant and semantic messages are transmitted to another device.

A device which has received the grant for semantic communication may identify the grant for semantic communication through RNTI (SC-RNTI) of Table 2, check which semantic message type has been transmitted through the DCI format information within the grant, and process the semantic message transmitted together with the grant according to the predetermined priorities based on the identification result.

FIG. 15 illustrates one example of flag settings for identifying semantic message types at a source in a system applicable to the present disclosure.

To identify semantic messages generated from devices which do not generate a grant, the following operations may be performed. First, as shown in FIG. 15, the source generates a semantic message from semantic data s that includes the meaning to be transmitted using background knowledge and a semantic encoder. Next, semantic message type check flag bits are configured to check the semantic message type and attached to the front of the generated semantic message to generate a final message; the final message is then transmitted to the destination. Resources needed to transmit the final message may be set during the initial configuration or may be allocated through the base station. The flag bits for checking the corresponding semantic message type may be configured in the same way as the bit configuration in the DCT format of FIG. 3.

At this time, when the source generates a plurality of semantic messages and generates a plurality of messages with semantic message type check flag bits through the process of FIG. 15, the source transmits the final messages generated according to the priorities set in advance to the destination.

FIG. 16 illustrates one example of checking flags for identifying semantic message types and processing of a semantic message at a destination in a system applicable to the present disclosure.

When a final message that includes semantic message type check flag bits is received at the destination without receiving a grant, operations as shown in FIG. 16 or FIG. 17 may be performed.

First, the destination checks only the semantic message type check flag bits in the message that includes flag bits for checking the semantic message type. At this time, the process of checking the corresponding flag bits may utilize part of the operations of the conventional communication system.

After checking the semantic message type check flag bits, the type of the semantic message following the flag bits may be identified; according to the predetermined priorities, the destination may operate as shown in FIG. 16 or FIG. 17 based on its configuration.

FIG. 16 illustrates a case where the semantic decoder and the target task at the destination are separated; in this case, the semantic message is processed using the semantic decoder and background knowledge to obtain semantic data s. Depending on the type of s, s is either used to update the background knowledge or used as input to perform reasoning using the background knowledge to determine if the reasoning output matches the meaning the source intends to transmit.

FIG. 17 illustrates one example of checking flags for identifying semantic message types and processing of a semantic message at a destination in a system applicable to the present disclosure.

FIG. 17 illustrates a case where the semantic decoder and the target task at the destination operate together; in this case, the semantic representation corresponding to the semantic message may be either used to update the background knowledge or used as input to the target task; the target task utilizes the background knowledge and performs reasoning operations to determine the meaning intended by the source.

FIG. 18 illustrates one example of a process of setting priorities for semantic message types and transmission and processing of semantic messages between a terminal and a base station in a system applicable to the present disclosure.

First, assuming the base station acts as a source in semantic communication, the base station may generate a grant related to resources. Accordingly, the base station generates a semantic message for transmitting semantic data that contains the meaning to be transmitted to a destination device, sets up a grant for semantic communication, and transmit the grant along with the semantic message to the device.

Afterwards, the device checks the received grant through a predefined RNTI (e.g., SC-RNTI) as shown in Table 3 and identifies the type of the accompanying semantic message by checking the DCI format within the received grant. Based on the value of the set semantic message type field, the device may determine the type of the received semantic message; subsequently, the device processes the semantic message using first background knowledge possessed by the device according to the predefined priorities.

If there is semantic data containing the meaning the device intends to transmit to the base station after the operation above, the device, which does not generate a grant, generates a semantic message using the semantic data and background knowledge as shown in FIG. 15, adds flag bits corresponding to the semantic message type to the front of the semantic message, and transmits the semantic message with the flag bits to the base station. The resources needed for the device to transmit the final message may be set at the time of initial configuration or allocated through the base station, where FIG. 18 illustrates that uplink resources are allocated through the base station and the semantic message is transmitted based on the allocated uplink resources.

The base station first checks flag bits corresponding to the semantic message type in the message received from the device through the operation as shown in FIG. 16 or FIG. 17, identifies the type of semantic message following the flag bits, and determines the priority of the received semantic message. Subsequently, the base station performs the process of interpreting the semantic message using the second background knowledge possessed by the base station according to the predefined priorities.

Depending on the embodiments, part of the steps shown in FIG. 18 may be omitted considering a specific situation and/or configuration.

FIG. 19 illustrates one example of a process of setting priorities for semantic message types and transmission and processing of semantic messages between a first node and a second node in a system applicable to the present disclosure.

First, when each node is configured to perform semantic communication operations without generating/transmitting a grant related to resource allocation, the resources for transmitting semantic messages to each node have to be configured during the initialization phase for semantic communication. This is necessary to enable communication between devices even when a separate base station is not involved in the semantic communication.

In the above situation, as shown in FIG. 15, the first node generates a semantic message using first background knowledge possessed by the first node to transmit semantic data that contains the meaning to be transmitted from the first node to the second node, adds flag bits to the front of the semantic message for the identification of the semantic message type, and transmits a final message according to the predefined priorities.

When the second node receives a message, the second node may check only the semantic message type check flag bits in the message, as shown in FIG. 16 or FIG. 17, and determine the type of the semantic message following the corresponding flag bits. Afterwards, a process of interpreting the semantic message using second background knowledge possessed by the second node is performed according to the predefined priorities.

After interpretation of the transmitted semantic message, the second node generates a semantic message using the second background knowledge possessed by the second node or adds flag bits indicating the message type to the front of the semantic message, and transmits the semantic message according to the predefined priorities; the first node, receiving the semantic message, performs the process of interpreting the semantic message using the background knowledge possessed by the first node according to the identification of the semantic message type field performed by the second node of FIG. 19 or predefined priorities.

As described above, the overall procedure between the first and second nodes is performed repeatedly.

If the base station agrees with the device not to perform operations related to semantic communication using grants while semantic communication is being performed between the device and the base station, operations may be performed between the device and the base station based on the embodiment of FIG. 19, rather than the embodiment of FIG. 18.

Depending on the embodiments, part of the steps shown in FIG. 19 may be omitted considering a specific situation and/or configuration.

Meanwhile, the present disclosure may be applied to a signal transmission and reception protocol using a semantic layer that may be newly added to a semantic communication system; however, the present disclosure is not limited to the specific implementation.

An exemplary procedure proposed according to one embodiment of the present disclosure is as follows.

In a system capable of semantic communication, where a plurality of semantic messages may be transmitted and received, priorities may be set based on the types of semantic messages used in the semantic communication.

Priority information is added based on the priorities set for the semantic messages that may be generated using the first background knowledge possessed by the source.

Semantic messages are transmitted from the source to the destination according to the set priorities.

The destination which has received the semantic message checks priority-related information of the semantic message.

The meaning of the semantic message is interpreted using the second background knowledge possessed by the destination according to the priority of the semantic message checked by the destination.

To perform semantic communication that addresses the problems described above, a new layer called a semantic layer, which controls the overall operations of semantic data and messages, may be added; the semantic layer may be disposed at both the source and the destination by considering the semantic communication system. To perform communication between the semantic layers at the source and the destination, it is necessary to define a protocol, which is a set of rules between the layers, and a series of operational processes.

Effects of Various Embodiments of the Present Disclosure

The present disclosure proposes a method and a procedure for a system capable of semantic communication that enables transmission and reception of a plurality of semantic messages, where the method and the procedure may set priorities for various types of semantic messages that may be transmitted and received in the system; configure RNTI and DCI format for semantic communication grants to identify the types of semantic messages; transmit the grant together with a semantic message generated using the first background knowledge possessed by a sender-side node or add semantic message type check flag bits to the front of a final semantic message generated based on the first background knowledge and transmit the semantic message according to its priority; determine the priority of a received, accompanying semantic message by checking the DCI format or semantic message type check flag bits at a receiver-side which receives the semantic message, and interpret the meaning contained in the semantic message using the second background knowledge possessed by the receiver-side node according to the priorities among a plurality of received semantic messages.

The proposed disclosure may set priorities for processing semantic message types according to the increase of the semantic message types related to semantic communication, generate related fields to determine the corresponding priorities, transmit semantic messages generated using background knowledge based on their priorities, and define a method and a procedure for processing semantic messages using background knowledge to check priority-related fields and interpret the semantic messages according to their priorities, and enable a device to perform related transmission/reception operations according to the priorities of a plurality of semantic messages when the plurality of semantic messages are transmitted/received in semantic communication, and reduce semantic errors due to semantic mismatch according to processing of semantic messages based on their priorities, and thus reduce the procedures related to the semantic messages for dealing with the semantic errors and reduce transmission/reception of the corresponding semantic messages, thereby helping to reduce consumption of resources.

[Descriptions of Claims Related to First Node]

In what follows, the embodiments above will be described in detail with reference to FIG. 20 from the operational perspective of the first node. The methods described below are separated from each other only for the convenience of descriptions; however, unless the methods are not mutually exclusive, part of configurations of one method may be substituted or combined with part of configurations of another method.

FIG. 20 illustrates one example of operation steps of a first node in a system applicable to the present disclosure.

According to various embodiments of the present disclosure, a method performed by the first node in a communication system is provided. According to the embodiments, the first node may be a terminal or a base station. According to the embodiments, the second node may be a base station or a terminal.

The embodiment of FIG. 20 may further include the following steps before the S2001 step: receiving one or more synchronization signals by the first node from the second node; receiving system information by the first node from the second node; and receiving control information by the first node from the second node.

In the S2001 step, the first node receives a plurality of first semantic messages from the second node, which include semantic data based on the second background knowledge of the second node. According to one embodiment, the first node may receive a plurality of first semantic messages from the second node, where the plurality of first semantic messages are generated by incorporating the second background knowledge into the semantic data based on the second background knowledge of the second node.

In the S2002 step, the first node identifies the first message type field within each of the plurality of first semantic messages.

In the S2003 step, the first node determines the priority of each of the plurality of first semantic messages based on the first message type field.

In the S2004 step, the first node processes each of the plurality of first semantic messages based on the first background knowledge of the first node and the determined priority.

In the S2005 step, the first node generates a plurality of second semantic messages, which include a second message type field, using the semantic data and the first background knowledge.

In the S2006 step, the first node transmits the plurality of second semantic messages to the second node.

According to various embodiments of the present disclosure, the first terminals belonging to the first terminal group have similar location information and channel information with each other, and the second terminals belonging to the second terminal group have similar location information and channel information with each other, while the first terminals and the second terminals may have different channel information.

According to various embodiments of the present disclosure, the first message type field may be related to the priority of each of the plurality of first semantic messages with respect to message processing within the first node.

According to various embodiments of the present disclosure, the second message type field may be related to the priority of each of the plurality of second semantic messages with respect to message processing within the second node.

According to various embodiments of the present disclosure, if the first message type field is related to an update message of the first background knowledge for semantic communication, the first background knowledge of the first node may be updated based on at least one of the plurality of first semantic messages. If the first message type field within one of the plurality of first semantic messages is related to the update message of the first background knowledge, update of the first background knowledge is performed. However, semantic messages may be processed based on the first background knowledge before the update is completed without waiting for the update of the first background knowledge to be completed. After the update of the first background knowledge is completed, semantic messages may be processed based on the updated first background knowledge.

According to various embodiments of the present disclosure, the embodiment of FIG. 20 may further include receiving a third semantic message from the second node and transmitting a semantic feedback message to the second node before receiving the plurality of first semantic messages. If the transmitted semantic feedback message differs from a feedback message expected by the second node, at least one of the plurality of first semantic messages may correspond to a semantic redundancy message of the third semantic message, and the first message type field may be related to the semantic redundancy message.

According to various embodiments of the present disclosure, the first message type field and the second message type field may be related to one of a background knowledge update message for semantic communication, a semantic redundancy message, a semantic feedback message, and a normal semantic message.

According to various embodiments of the present disclosure, the priorities are in the order of background knowledge update message for semantic communication, semantic redundancy message, semantic feedback message, and normal semantic message; and the background knowledge update message for semantic communication has the highest priority.

According to various embodiments of the present disclosure, when the plurality of second semantic messages are composed of a plurality of semantic messages, each of the plurality of second semantic messages may be transmitted in the order of priority of each of the plurality of second semantic messages.

According to various embodiments of the present disclosure, the embodiment of FIG. 20 may further include receiving a grant for transmission resources together with the plurality of first semantic messages when the second node is a base station. The plurality of second semantic messages may be transmitted based on the grant.

According to various embodiments of the present disclosure, the grant is received together with a radio network temporary identifier for semantic communication (SC-RNTI) specified for semantic communication, and the grant is identified by the SC-RNTI.

According to various embodiments of the present disclosure, a first node is provided in a communication system. The first node may comprise a transceiver and at least one processor, wherein the at least one processor may be configured to perform the method for operating the first node according to FIG. 20.

According to various embodiments of the present disclosure, a device for controlling the first node in a communication system is provided. The device comprises at least one processor; and at least one memory operatively connected to the at least one processor. The at least one memory may be configured to store instructions that, when being executed by the at least one processor, perform the method for operating the first node according to FIG. 20.

According to various embodiments of the present disclosure, one or more non-transitory computer readable media (CRM) storing one or more commands are provided. The one or more commands, when executed by one or more processors, may perform operations, and the operations may include the method for operating the first node according to FIG. 20.

[Descriptions of Claims Related to Second Node]

In what follows, the embodiments above will be described in detail with reference to FIG. 21 from the operational perspective of the second node. The methods described below are separated from each other only for the convenience of descriptions; however, unless the methods are not mutually exclusive, part of configurations of one method may be substituted or combined with part of configurations of another method.

FIG. 21 illustrates one example of operation steps of a second node in a system applicable to the present disclosure.

According to various embodiments of the present disclosure, a method performed by the second node in a communication system is provided. According to the embodiments, the first node may be a terminal or a base station. According to the embodiments, the second node may be a base station or a terminal.

The embodiment in FIG. 21 may further include the following steps before the S2101 step: transmitting one or more synchronization signals by the second node to the first node; transmitting system information by the second node to the first node; and transmitting control information by the second node to the second node.

In the S2101 step, the second node transmits a plurality of first semantic messages to the first node, which include semantic data based on the second background knowledge of the second node. Each of the plurality of first semantic messages may include a first message type field. Each of the plurality of first semantic messages may be processed based on the first priority determined according to the first message type field and the first background knowledge of the first node. According to one embodiment, the second node may transmit a plurality of first semantic messages to the first node, where the plurality of first semantic messages are generated by incorporating the second background knowledge into the semantic data based on the second background knowledge of the second node.

In the S2102 step, the second node receives, from the first node, the second semantic messages generated using the semantic data and the first background knowledge of the first node.

In the S2103 step, the second node identifies the second message type field within each of the plurality of second semantic messages.

In the S2104 step, the second node determines the second priority of each of the plurality of second semantic messages based on the second message type field.

In the S2105 step, the second node processes each of the plurality of second semantic messages based on the second background knowledge and the second priority.

According to various embodiments of the present disclosure, the first message type field may be related to the priority of each of the plurality of first semantic messages with respect to message processing within the first node.

According to various embodiments of the present disclosure, the second message type field may be related to the priority of each of the plurality of second semantic messages with respect to message processing within the second node.

According to various embodiments of the present disclosure, if the first message type field is related to an update message of the first background knowledge for semantic communication, the first background knowledge of the first node may be updated based on at least one of the plurality of first semantic messages. If the first message type field within one of the plurality of first semantic messages is related to the update message of the first background knowledge, update of the first background knowledge is performed. However, semantic messages may be processed based on the first background knowledge before the update is completed without waiting for the update of the first background knowledge to be completed. After the update of the first background knowledge is completed, semantic messages may be processed based on the updated first background knowledge.

According to various embodiments of the present disclosure, the embodiment of FIG. 21 may further include transmitting a third semantic message to the first node and receiving a semantic feedback message to the first node before transmitting the plurality of first semantic messages. If the received semantic feedback message differs from a feedback message expected by the second node, at least one of the plurality of first semantic messages may correspond to a semantic redundancy message of the third semantic message, and the first message type field may be related to the semantic redundancy message.

According to various embodiments of the present disclosure, the first message type field and the second message type field may be related to one of a background knowledge update message for semantic communication, a semantic redundancy message, a semantic feedback message, and a normal semantic message.

According to various embodiments of the present disclosure, the priorities are in the order of background knowledge update message for semantic communication, semantic redundancy message, semantic feedback message, and normal semantic message; and the background knowledge update message for semantic communication has the highest priority.

According to various embodiments of the present disclosure, when the plurality of second semantic messages are composed of a plurality of semantic messages, each of the plurality of second semantic messages may be received in the order of the second priority of each of the plurality of second semantic messages.

According to various embodiments of the present disclosure, the embodiment of FIG. 21 may further include transmitting a grant for transmission resources to the first node together with the plurality of first semantic messages when the second node is a base station. The plurality of second semantic messages may be transmitted based on the grant.

According to various embodiments of the present disclosure, the grant is transmitted together with a radio network temporary identifier for semantic communication (SC-RNTI) specified for semantic communication, and the grant is identified by the SC-RNTI.

According to various embodiments of the present disclosure, a second node is provided in a communication system. The second node may comprise a transceiver and at least one processor, wherein the at least one processor may be configured to perform the method for operating the second node according to FIG. 21.

According to various embodiments of the present disclosure, a device for controlling the second node in a communication system is provided. The device comprises at least one processor; and at least one memory operatively connected to the at least one processor. The at least one memory may be configured to store instructions that, when being executed by the at least one processor, perform the method for operating the server according to FIG. 21.

According to various embodiments of the present disclosure, one or more non-transitory computer readable media (CRM) storing one or more commands are provided. The one or more commands, when executed by one or more processors, may perform operations, and the operations may include the method for operating the second node according to FIG. 21.

Communication System Applicable to the Present Disclosure

FIG. 22 illustrates a communication system 1 applied to various embodiments of the present disclosure.

Referring to FIG. 22, a communication system 1 applied to various embodiments of the present disclosure includes a wireless device, a base station, and a network. Herein, the wireless device refers to a device performing communication using Radio Access Technology (RAT) (e.g., 5G New RAT (NR)) or Long-Term Evolution (LTE), 6G wireless communication) and may be referred to as communication/radio/5G device/6G device. Although not limited thereto, the wireless devices may include a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BS and the network may be implemented as wireless devices and a specific wireless device 200*a* may operate as a BS/network node with respect to other wireless devices.

The wireless devices 100*a* to 100*f* may be connected to the network 300 via the BS 200. An Artificial Intelligence (AI) technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network, or 6G network. Although the wireless devices 100*a* to 100*f* may communicate with each other through the BS 200/network 300, the wireless devices 100*a* to 100*f* may perform direct communication (e.g., sidelink communication) with each other without passing through the BS/network. For example, the vehicles 100*b*-1 and 100*b*-2 may perform direct communication (e.g. Vehicle-to-Vehicle (V2V)/Vehicle-to-everything (V2X) communication). Additionally, the IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BS/the wireless device, the base station and the base station may transmit/receive radio signals to/from each other through the wireless communication/connections 150*a*, 150*b*, and 150*c*. For example, the wireless communication/connections 150*a*, 150*b*, and 150*c* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports multiple numerology (or subcarrier spacing (SCS)) to support various 5G services. For example, when SCS is 15 kHz, it supports a wide area in traditional cellular bands, and when SCS is 30 kHz/60 kHz, it supports dense-urban, lower latency, and wider carrier bandwidth, when SCS is 60 kHz or higher, it supports bandwidth greater than 24.25 GHz to overcome phase noise.

The NR frequency band can be defined as two types of frequency ranges (FR1, FR2). The values of the frequency range may be changed, for example, and the frequency ranges of the two types (FR1, FR2) may be as shown in Table 4 below. For convenience of explanation, among the frequency ranges used in the NR system, FR1 may mean "sub 6 GHz range", and FR2 may mean "above 6 GHz range" and may be called millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the numerical value of the frequency range of the NR system can be changed. For example, FR1 may include a band of 410 MHz to 7125 MHz as shown in Table 5 below. That is, FR1 may include a frequency band of 6 GHz (or 5850, 5900, 5925 MHz, etc.). For example, the frequency band above 6 GHz (or 5850, 5900, 5925 MHZ, etc.) included within FR1 may include an unlicensed band. Unlicensed bands can be used for a variety of purposes, for example, for communications for vehicles (e.g., autonomous driving).

TABLE 5

| Frequency Range designation | Corresponding frequency range | Subcarrier Spacing |
|---|---|---|
| FR1 | 41 MHz-7125 MHz | 15, 30, 60 kHz |
| FR2 | 24250 MHz-52600 MHz | 60, 120, 240 kHz |

Wireless Device Applicable to the Present Disclosure

Examples of a wireless device to which various embodiments of the present disclosure are applied are described below.

FIG. 23 illustrates a wireless device applicable to various embodiments of the present disclosure.

Referring to FIG. 23, a first wireless device 100 and a second wireless device 200 may transmit and receive radio signals through various wireless access technologies (e.g., LTE and NR). {The first wireless device 100 and the second wireless device 200} may correspond to {the wireless device

100*x* and the base station 200} and/or {the wireless device 100*x* and the wireless device 100*x*} of FIG. 22.

The first wireless device 100 may include one or more processors 102 and one or more memories 104 and may further include one or more transceivers 106 and/or one or more antennas 108. The processor 102 may control the memory 104 and/or the transceiver 106 and may be configured to implement the descriptions, functions, procedures, proposals, methods and/or operation flowcharts described in the present disclosure. For example, the processor 102 may process information within the memory 104 to generate first information/signal, and then transmit a radio signal including the first information/signal through the transceiver 106. Further, the processor 102 may receive a radio signal including second information/signal through the transceiver 106, and then store in the memory 104 information obtained from signal processing of the second information/signal. The memory 104 may be connected to the processor 102 and store various information related to an operation of the processor 102. For example, the memory 104 may store software codes including instructions for performing all or some of processes controlled by the processor 102 or performing the descriptions, functions, procedures, proposals, methods and/or operation flowcharts described in the present disclosure. The processor 102 and the memory 104 may be a part of a communication modem/circuit/chip designed to implement the wireless communication technology (e.g., LTE and NR). The transceiver 106 may be connected to the processor 102 and may transmit and/or receive the radio signals via one or more antennas 108. The transceiver 106 may include a transmitter and/or a receiver. The transceiver 106 may be used interchangeably with a radio frequency (RF) unit. In various embodiments of the present disclosure, the wireless device may mean the communication modem/circuit/chip.

The second wireless device 200 may include one or more processors 202 and one or more memories 204 and may further include one or more transceivers 206 and/or one or more antennas 208. The processor 202 may control the memory 204 and/or the transceiver 206 and may be configured to implement the descriptions, functions, procedures, proposals, methods and/or operation flowcharts described in the present disclosure. For example, the processor 202 may process information within the memory 204 to generate third information/signal and then transmit a radio signal including the third information/signal through the transceiver 206. Further, the processor 202 may receive a radio signal including fourth information/signal through the transceiver 206 and then store in the memory 204 information obtained from signal processing of the fourth information/signal. The memory 204 may be connected to the processor 202 and store various information related to an operation of the processor 202. For example, the memory 204 may store software codes including instructions for performing all or some of processes controlled by the processor 202 or performing the descriptions, functions, procedures, proposals, methods and/or operation flowcharts described in the present disclosure. The processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver, and the transceiver 206 may be used interchangeably with the RF unit. In various embodiments of the present disclosure, the wireless device may mean the communication modem/circuit/chip.

Hardware elements of the wireless devices 100 and 200 are described in more detail below. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) based on the descriptions, functions, procedures, proposals, methods and/or operation flowcharts described in the present disclosure. One or more processors 102 and 202 may generate messages, control information, data, or information based on the descriptions, functions, procedures, proposals, methods and/or operation flowcharts described in the present disclosure. One or more processors 102 and 202 may generate a signal (e.g., a baseband signal) including the PDU, the SDU, the messages, the control information, the data, or the information based on the functions, procedures, proposals and/or methods described in the present disclosure, and provide the generated signal to one or more transceivers 106 and 206. One or more processors 102 and 202 may receive the signal (e.g., baseband signal) from one or more transceivers 106 and 206 and acquire the PDU, the SDU, the messages, the control information, the data, or the information based on the descriptions, functions, procedures, proposals, methods and/or operation flowcharts described in the present disclosure.

One or more processors 102 and 202 may be referred to as a controller, a microcontroller, a microprocessor, or a microcomputer. One or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The descriptions, functions, procedures, proposals, methods and/or operation flowcharts described in the present disclosure may be implemented using firmware or software, and the firmware or software may be implemented to include modules, procedures, functions, and the like. Firmware or software configured to perform the descriptions, functions, procedures, proposals, methods and/or operation flowcharts described in the present disclosure may be included in one or more processors 102 and 202 or stored in one or more memories 104 and 204 and may be executed by one or more processors 102 and 202. The descriptions, functions, procedures, proposals, methods and/or operation flowcharts described in the present disclosure may be implemented using firmware or software in the form of codes, instructions and/or a set form of instructions.

The one or more memories 104 and 204 may be connected to the one or more processors 102 and 202 and store various types of data, signals, messages, information, programs, codes, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located inside and/or outside the one or more processors 102 and 202. The one or more memories 104 and 204 may be connected to the one or more processors 102 and 202 through various technologies such as wired or wireless connection.

The one or more transceivers 106 and 206 may transmit, to one or more other devices, user data, control information, radio signals/channels, etc. mentioned in the methods and/or operation flowcharts of the present disclosure. The one or more transceivers 106 and 206 may receive, from the one or more other devices, the user data, control information, radio signals/channels, etc. mentioned in the descriptions, functions, procedures, proposals, methods and/or operation flowcharts described in the present disclosure. For example, the one or more transceivers 106 and 206 may be connected to the one or more processors 102 and 202 and transmit and receive radio signals. For example, the one or more processors 102 and 202 may control the one or more transceivers 106 and 206 to transmit the user data, control information, or radio signals to the one or more other devices. The one or more processors 102 and 202 may control the one or more transceivers 106 and 206 to receive the user data, control information, or radio signals from the one or more other devices. The one or more transceivers 106 and 206 may be connected to the one or more antennas 108 and 208, and the one or more transceivers 106 and 206 may be configured to transmit and receive over the one or more antennas 108 and 208 the user data, control information, radio signals/channels, etc. mentioned in the descriptions, functions, procedures, proposals, methods and/or operation flowcharts described in the present disclosure. In the present disclosure, the one or more antennas may be a plurality of physical antennas or a plurality of logical antennas (e.g., antenna ports). The one or more transceivers 106 and 206 may convert the received radio signals/channels etc. from RF band signals to baseband signals in order to process the received user data, control information, radio signals/channels, etc. using the one or more processors 102 and 202. The one or more transceivers 106 and 206 may convert the user data, control information, radio signals/channels, etc. processed using the one or more processors 102 and 202 from the baseband signals to the RF band signals. To this end, the one or more transceivers 106 and 206 may include (analog) oscillators and/or filters.

FIG. 24 illustrates another example of a wireless device applicable to various embodiments of the present disclosure.

Referring to FIG. 24, a wireless device may include at least one processor 102 and 202, at least one memory 104 and 204, at least one transceiver 106 and 206, and one or more antennas 108 and 208.

The wireless device illustrated in FIG. 23 is different from the wireless device illustrated in FIG. 24 in that the processors 102 and 202 and the memories 104 and 204 are separated from each other in FIG. 23, and the processors 102 and 202 include the memories 104 and 204 in FIG. 24.

Since the detailed description for the processors 102 and 202, the memories 104 and 204, the transceivers 106 and 206, and the one or more antennas 108 and 208 illustrated in FIG. 29 is the same as that described above, repetitive descriptions are omitted to avoid unnecessary repetition of description.

Examples of a signal processing circuit to which various embodiments of the present disclosure are applied are described below.

FIG. 25 illustrates a signal processing circuit for a transmission signal.

Referring to FIG. 25, a signal processing circuit 1000 may include scramblers 1010, modulators 1020, a layer mapper 1030, a precoder 1040, resource mappers 1050, and signal generators 1060. Although not limited to this, an operation/function of FIG. 25 may be performed by the processors 102 and 202 and/or the transceivers 106 and 206 of FIG. 23. Hardware elements of FIG. 25 may be implemented by the processors 102 and 202 and/or the transceivers 106 and 206 of FIG. 23. For example, blocks 1010 to 1060 may be implemented by the processors 102 and 202 of FIG. 23. Further, the blocks 1010 to 1050 may be implemented by the processors 102 and 202 of FIG. 23, and the block 1060 may be implemented by the transceivers 106 and 206 of FIG. 23.

Codewords may be converted into radio signals via the signal processing circuit 1000 of FIG. 25. The codewords are encoded bit sequences of information blocks. The information blocks may include transport blocks (e.g., a UL-SCH transport block, a DL-SCH transport block). The radio signals may be transmitted via various physical channels (e.g., PUSCH, PDSCH, etc.).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM).

Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W, where N is the number of antenna ports, and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols, and the generated radio signals may be transmitted to other devices over each antenna. To this end, the signal generators 1060 may include inverse fast Fourier transform (IFFT) modules, cyclic prefix (CP) inserters, digital-to-analog converters (DACs), and frequency up-converters.

Signal processing procedures for a received signal in the wireless device may be configured in a reverse manner of the signal processing procedures 1010 to 1060 of FIG. 25. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency down-converters, analog-to-digital converters (ADCs), CP remover, and fast Fourier transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of use of a wireless device to which various embodiments of the present disclosure are applied are described below.

FIG. 26 illustrates another example of a wireless device applied to various embodiments of the present disclosure. The wireless device may be implemented in various forms based on use cases/services (see FIG. 22).

Referring to FIG. 26, wireless devices 100 and 200 may correspond to the wireless devices 100 and 200 of FIG. 23 and may consist of various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/codes/instructions/information stored in the memory unit 130. The control unit 120 may transmit the information stored in the memory unit 130 to the exterior (e.g., other communication devices) through the communication unit 110 via a wireless/wired interface or store, in the memory unit 130, information received via the wireless/wired interface from the exterior (e.g., other communication devices) through the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of the robot (100*a* of FIG. 22), the vehicles (100*b*-1 and 100*b*-2 of FIG. 22), the XR device (100*c* of FIG. 22), the hand-held device (100*d* of FIG. 22), the home appliance (100*e* of FIG. 22), the IoT device (100*f* of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc., but is not limited thereto. The wireless device may be used in a mobile or fixed place based on a use-example/service.

In FIG. 26, all the various elements, components, units/parts, and/or modules of the wireless devices 100 and 200 may be connected to each other via wired interfaces or at least a part thereof may be wirelessly connected through the communication unit 110. For example, in each of the wireless devices 100 and 200, the control unit 120 and the communication unit 110 may be connected by wire, and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may consist of a set of one or more processors. As an example, the control unit 120 may include a set of a communication control processor, an application processor, an electronic control unit (ECU), a graphical processing unit, and a memory control processor. As another example, the memory 130 may include a random access memory (RAM), a dynamic RAM (DRAM), a read only memory (ROM)), a flash memory, a volatile memory, a non-volatile memory, and/or a combination thereof.

Examples of implementation of FIG. 26 are described in more detail below.

FIG. 27 illustrates a hand-held device applied to various embodiments of the present disclosure. The hand-held device may include a smartphone, a smartpad, a wearable device (e.g., a smartwatch or a smartglasses), or a portable computer (e.g., a notebook). The mobile device may be referred to as a mobile station (MS), a user terminal (UT), a mobile subscriber station (MSS), a subscriber station (SS), an advanced mobile station (AMS), or a wireless terminal (WT).

Referring to FIG. 27, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 26, respectively.

The communication unit 110 may transmit and receive signals (e.g., data and control signals) to and from other wireless devices or BSs. The control unit 120 may perform various operations by controlling components of the hand-held device 100. The control unit 120 may include an application processor (AP). The memory unit 130 may store data/parameters/programs/codes/instructions needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, for data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 28 illustrates a vehicle or an autonomous vehicle applied to various embodiments of the present disclosure.

The vehicle or autonomous vehicle may be implemented by a mobile robot, a car, a train, a manned/unmanned Aerial Vehicle (AV), a ship, etc.

Referring to FIG. 28, a vehicle or autonomous vehicle 100 may include an antenna unit 108, a communication unit 110, a control unit 120, a driving unit 140*a*, a power supply unit 140*b*, a sensor unit 140*c*, and an autonomous driving unit

140*d*. The antenna unit 108 may be configured as a part of the communication unit 110. The blocks 110/130/140*a* to 140*d* correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an electronic control unit (ECU). The driving unit 140*a* may allow the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* so that the vehicle or the autonomous vehicle 100 moves along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transmit information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

FIG. 29 illustrates a vehicle applied to various embodiments of the present disclosure. The vehicle may be implemented as a transport means, a train, an aerial vehicle, a ship, etc.

Referring to FIG. 29, a vehicle 100 may include a communication unit 110, a control unit 120, a memory unit 130, an I/O unit 140*a*, and a positioning unit 140*b*. The blocks 110 to 130/140*a* and 140*b* correspond to blocks 110 to 130/140 of FIG. 26, respectively.

The communication unit 110 may transmit and receive signals (e.g., data and control signals) to and from external devices such as other vehicles or base stations. The control unit 120 may perform various operations by controlling components of the vehicle 100. The memory unit 130 may store data/parameters/programs/codes/instructions for supporting various functions of the vehicle 100. The I/O unit 140*a* may output an AR/VR object based on information within the memory unit 130. The I/O unit 140*a* may include an HUD. The positioning unit 140*b* may acquire location information of the vehicle 100. The location information may include absolute location information of the vehicle 100, location information of the vehicle 100 within a traveling lane, acceleration information, and location information of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain vehicle location information through the GPS and the various sensors and store the obtained information in the memory unit 130. The control unit 120 may generate a virtual object based on the map information, the traffic information, and the vehicle location information, and the I/O unit 140*a* may display the generated virtual object on a window in the vehicle (1410 and 1420). The control unit 120 may determine whether the vehicle 100 normally drives within a traveling lane, based on the vehicle location information. If the vehicle 100 abnormally exits from the traveling lane, the control unit 120 may display a warning on the window in the vehicle through the I/O unit 140*a*. In addition, the control unit 120 may broadcast a warning message about driving abnormity to neighboring vehicles through the communication unit 110. According to situations, the control unit 120 may transmit the location information of the vehicle and the information about driving/vehicle abnormality to related organizations through the communication unit 110.

FIG. 30 illustrates an XR device applied to various embodiments of the present disclosure. The XR device may be implemented as an HMD, a head-up display (HUD) mounted in a vehicle, a television, a smartphone, a computer, a wearable device, a home appliance, a digital signage, a vehicle, a robot, etc.

Referring to FIG. 30, an XR device 100*a* may include a communication unit 110, a control unit 120, a memory unit 130, an I/O unit 140*a*, a sensor unit 140*b*, and a power supply unit 140*c*. The blocks 110 to 130/140*a* to 140*c* correspond to the blocks 110 to 130/140 of FIG. 26, respectively.

The communication unit 110 may transmit and receive signals (e.g., media data, control signal, etc.) to and from external devices such as other wireless devices, handheld devices, or media servers. The media data may include video, images, sound, etc. The control unit 120 may control components of the XR device 100*a* to perform various operations. For example, the control unit 120 may be configured to control and/or perform procedures such as video/image acquisition, (video/image) encoding, and metadata generation and processing. The memory unit 120 may store data/parameters/programs/codes/instructions required to drive the XR device 100*a*/generate an XR object. The I/O unit 140*a* may obtain control information, data, etc. from the outside and output the generated XR object. The I/O unit 140*a* may include a camera, a microphone, a user input unit, a display, a speaker, and/or a haptic module. The sensor unit 140*b* may obtain a state, surrounding environment information, user information, etc. of the XR device 100*a*. The sensor 140*b* may include a proximity sensor, an illumination sensor, an acceleration sensor, a magnetic sensor, a gyro sensor, an inertial sensor, an RGB sensor, an IR sensor, a fingerprint scan sensor, an ultrasonic sensor, a light sensor, a microphone, and/or a radar. The power supply unit 140*c* may supply power to the XR device 100*a* and include a wired/wireless charging circuit, a battery, etc.

For example, the memory unit 130 of the XR device 100*a* may include information (e.g., data) required to generate the XR object (e.g., an AR/VR/MR object). The I/O unit 140*a* may obtain instructions for manipulating the XR device 100*a* from a user, and the control unit 120 may drive the XR device 100*a* based on a driving instruction of the user. For example, if the user desires to watch a film, news, etc. through the XR device 100*a*, the control unit 120 may transmit content request information to another device (e.g., a handheld device 100*b*) or a media server through the communication unit 110. The communication unit 110 may download/stream content such as films and news from another device (e.g., the handheld device 100*b*) or the media server to the memory unit 130. The control unit 120 may control and/or perform procedures, such as video/image acquisition, (video/image) encoding, and metadata generation/processing, for the content and generate/output the XR object based on information about a surrounding space or a real object obtained through the I/O unit 140*a*/sensor unit 140*b*.

The XR device 100*a* may be wirelessly connected to the handheld device 100*b* through the communication unit 110, and the operation of the XR device 100*a* may be controlled by the handheld device 100*b*. For example, the handheld device 100*b* may operate as a controller of the XR device 100*a*. To this end, the XR device 100*a* may obtain 3D location information of the handheld device 100*b* and generate and output an XR object corresponding to the handheld device 100*b*.

FIG. 31 illustrates a robot applied to various embodiments of the present disclosure. The robot may be categorized into an industrial robot, a medical robot, a household robot, a military robot, etc., based on a used purpose or field.

Referring to FIG. 31, a robot 100 may include a communication unit 110, a control unit 120, a memory unit 130, an I/O unit 140*a*, a sensor unit 140*b*, and a power supply unit 140*c*. The blocks 110 to 130/140*a* to 140*c* correspond to the blocks 110 to 130/140 of FIG. 26, respectively.

The communication unit 110 may transmit and receive signals (e.g., driving information and control signals) to and from external devices such as other wireless devices, other robots, or control servers. The control unit 120 may perform various operations by controlling components of the robot 100. The memory unit 130 may store data/parameters/programs/codes/instructions for supporting various functions of the robot 100. The I/O unit 140*a* may obtain information from the outside of the robot 100 and output information to the outside of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may allow the robot 100 to travel on the road or to fly. The driving unit 140*c* may include an actuator, a motor, a wheel, a brake, a propeller, etc.

FIG. 32 illustrates an AI device applied to various embodiments of the present disclosure.

The AI device may be implemented as a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 32, an AI device 100 may include a communication unit 110, a control unit 120, a memory unit 130, an input unit 140*a*, an out unit 140*b*, a learning processor unit 140*c*, and a sensor unit 140*d*. The blocks 110 to 130/140*a* to 140*d* correspond to the blocks 110 to 130/140 of FIG. 26, respectively.

The communication unit 110 may transmit and receive wired/radio signals (e.g., sensor information, user input, learning models, or control signals) to and from external devices such as other AI devices (e.g., 100*x*, 200, or 400 of FIG. 22) or an AI server 200 using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling components of the AI device 100. For example, the control unit 120 may request, search, receive, or use data of the learning processor unit 140*c* or the memory unit 130 and control the components of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 22). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 22). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

The claims described in various embodiments of the present disclosure can be combined in various ways. For example, technical features of the method claims of various embodiments of the present disclosure can be combined and implemented as a device, and technical features of the device claims of various embodiments of the present disclosure can be combined and implemented as a method. In addition, the technical features of the method claims and the technical features of the device claims in various embodiments of the present disclosure can be combined and implemented as a device, and the technical features of the method claims and the technical features of the device claims in various embodiments of the present disclosure can be combined and implemented as a method.

The invention claimed is:

1. A method for operating a first node in a communication system, the method comprising:

receiving one or more synchronization signals from a second node;

receiving system information from the second node;

receiving control information from the second node;

receiving a plurality of first semantic messages including semantic data based on second background knowledge of the second node from the second node;

identifying a first message type field in each of the plurality of first semantic messages;

determining a priority of each of the plurality of first semantic messages based on the first message type field;

processing each of the plurality of first semantic messages based on first background knowledge of the first node and the priority;

generating a plurality of second semantic messages including a second message type field using the semantic data and the first background knowledge; and transmitting the plurality of second semantic messages to the second node.

2. The method of claim 1, wherein the first message type field and the second message type field are related to one of background knowledge update message for semantic communication, semantic redundancy message, semantic feedback message, and normal semantic message;

the priorities are in the order of background knowledge update message for semantic communication, semantic redundancy message, semantic feedback message, and normal semantic message; and the background knowledge update message for semantic communication has the highest priority.

3. The method of claim 1, wherein the first message type field is related to the priority of each of the plurality of first semantic messages for message processing within the first node, and the second message type field is related to the priority of each of the plurality of second semantic messages for message processing within the second node.

4. The method of claim 1, wherein, when the first message type field is related to an update message of the first background knowledge for semantic communication, the first background knowledge of the first node is updated based on at least one of the plurality of first semantic messages.

5. The method of claim 1, further comprising:

receiving a third semantic message from the second node before receiving the plurality of first semantic messages and transmitting a semantic feedback message to the second node, wherein, when the transmitted semantic feedback message differs from a feedback message expected from the second node, at least one of the plurality of first semantic messages corresponds to a semantic redundancy message of the third semantic message, and the first message type field is related to the semantic redundancy message.

6. The method of claim 1, wherein, when the plurality of second semantic messages are composed of a plurality of semantic messages, each of the plurality of second semantic messages is transmitted in the order of priority of each of the plurality of second semantic messages.

7. The method of claim 1, further comprising:

receiving a grant for transmission resources together with the plurality of first semantic messages when the second node is a base station, wherein the plurality of second semantic messages are transmitted based on the grant.

8. The method of claim 7, wherein the grant is received together with a radio network temporary identifier for semantic communication (SC-RNTI) specified for semantic communication, and the grant is identified by the SC-RNTI.

9. A method for operating a second node in a communication system, the method comprising:

transmitting one or more synchronization signals to a first node;

transmitting system information to the first node;

transmitting control information to the first node;

transmitting a plurality of first semantic messages including semantic data based on second background knowledge of the second node to the first node, wherein each of the plurality of first semantic messages includes a first message type field, and each of the plurality of first semantic messages is processed based on a first priority determined according to the first message type field and first background knowledge of the first node;

receiving a plurality of second semantic messages generated using the semantic data and the first background knowledge from the first node;

identifying a second message type field within each of the plurality of second semantic messages;

determining a second priority of each of the plurality of second semantic messages based on the second message type field; and processing each of the plurality of second semantic messages based on the second background knowledge and the second priority.

10. The method of claim 9, wherein the first message type field and the second message type field are related to one of background knowledge update message for semantic communication, semantic redundancy message, semantic feedback message, and normal semantic message;

the priorities are in the order of background knowledge update message for semantic communication, semantic redundancy message, semantic feedback message, and normal semantic message; and the background knowledge update message for semantic communication has the highest priority.

11. The method of claim 9, wherein the first message type field is related to the priority of each of the plurality of first semantic messages for message processing within the first node, and the second message type field is related to the priority of each of the plurality of second semantic messages for message processing within the second node.

12. The method of claim 9, wherein, when the first message type field is related to an update message of the first background knowledge for semantic communication, the first background knowledge of the first node is updated based on at least one of the plurality of first semantic messages.

13. The method of claim 9, further comprising:

transmitting a third semantic message to the first node before transmitting the plurality of first semantic messages and receiving a semantic feedback message from the first node, wherein, when the received semantic feedback message differs from a feedback message expected from the second node, at least one of the plurality of first semantic messages corresponds to a semantic redundancy message of the third semantic message, and the first message type field is related to the semantic redundancy message.

14. The method of claim 9, wherein, when the plurality of second semantic messages are composed of a plurality of semantic messages, each of the plurality of second semantic messages is received in the order of priority of each of the plurality of second semantic messages.

15. The method of claim 9, further comprising:

transmitting a grant for transmission resources together with the plurality of first semantic messages to the first node when the second node is a base station, wherein the plurality of second semantic messages are received based on the grant.

16. The method of claim 15, wherein the grant is transmitted together with a radio network temporary identifier for semantic communication (SC-RNTI) specified for semantic communication, and the grant is identified by the SC-RNTI.

17. A first node in a communication system, the first node comprising:

a transceiver; and at least one processor, wherein the processor is configured to:

receive one or more synchronization signals from a second node;

receive system information from the second node;

receive control information from the second node;

receive a plurality of first semantic messages including semantic data based on second background knowledge of the second node from the second node;

identify a first message type field in each of the plurality of first semantic messages;

determine a priority of each of the plurality of first semantic messages based on the first message type field;

process each of the plurality of first semantic messages based on first background knowledge of the first node and the priority;

generate a plurality of second semantic messages including a second message type field using the semantic data and the first background knowledge; and transmit the plurality of second semantic messages to the second node.

* * * * *